United States Patent
Yoneyama

(10) Patent No.: US 10,443,817 B2
(45) Date of Patent: Oct. 15, 2019

(54) BACKLIGHT UNIT AND IMAGE DISPLAY DEVICE

(71) Applicant: FUJIFILM Corporation, Tokyo (JP)

(72) Inventor: Hiroyuki Yoneyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 108 days.

(21) Appl. No.: 15/695,340

(22) Filed: Sep. 5, 2017

(65) Prior Publication Data

US 2017/0365225 A1 Dec. 21, 2017

Related U.S. Application Data

(63) Continuation of application No. PCT/JP2016/056765, filed on Mar. 4, 2016.

(30) Foreign Application Priority Data

Mar. 6, 2015 (JP) ................. 2015-045113

(51) Int. Cl.
*G09G 3/36* (2006.01)
*F21V 9/30* (2018.01)
(Continued)

(52) U.S. Cl.
CPC .......... *F21V 9/30* (2018.02); *G02F 1/133603* (2013.01); *G02F 1/133605* (2013.01);
(Continued)

(58) Field of Classification Search
CPC .... G09G 3/36; G09G 3/30; F21V 7/04; G06F 3/041; G06F 3/045; G01R 27/26
See application file for complete search history.

(56) References Cited

U.S. PATENT DOCUMENTS

| 2010/0188601 | A1 | 7/2010 | Onishi |
| 2012/0099048 | A1* | 4/2012 | Yamazaki ......... G02F 1/133514 349/62 |

(Continued)

FOREIGN PATENT DOCUMENTS

| JP | 2004-212503 A | 7/2004 |
| JP | 2010-177191 A | 8/2010 |

(Continued)

OTHER PUBLICATIONS

International Search Report issued in PCT/JP2016/056765 dated May 24, 2016.
(Continued)

*Primary Examiner* — Pegeman Karimi
(74) *Attorney, Agent, or Firm* — Edwards Neils LLC; Jean C. Edwards, Esq.

(57) ABSTRACT

The backlight unit includes a light source unit, and a wavelength conversion member disposed on an optical path of light emitted from the light source unit. The light source unit includes a light source allocated to each of the areas, a control of the backlight brightness for each area is performed by controlling a light emission intensity of each light source allocated to each area independently of a light emission intensity of a light source allocated to a different area, and a light source allocated to at least one area includes a light source group including two or more kinds of light sources having different light emission maximum wavelengths, and a light emission intensity of at least one kind of light source included in the light source group is capable of being controlled independently of a light emission intensity of a different light source included in the light source group.

13 Claims, 8 Drawing Sheets

(51) Int. Cl.
  *G02F 1/1335* (2006.01)
  *G02F 1/1343* (2006.01)
  *G09G 3/34* (2006.01)

(52) U.S. Cl.
  CPC .. *G02F 1/133606* (2013.01); *G02F 1/133611* (2013.01); *G02F 1/134309* (2013.01); *G09G 3/3413* (2013.01); *G02F 2001/133601* (2013.01); *G02F 2001/133607* (2013.01); *G02F 2001/133614* (2013.01); *G09G 2320/0233* (2013.01); *G09G 2320/0238* (2013.01); *G09G 2320/0242* (2013.01); *G09G 2320/064* (2013.01); *G09G 2320/0626* (2013.01); *G09G 2320/0686* (2013.01)

(56) References Cited

U.S. PATENT DOCUMENTS

| | | | | |
|---|---|---|---|---|
| 2012/0112215 A1* | 5/2012 | Chai | ............... | H01L 25/0753 257/89 |
| 2012/0113672 A1 | 5/2012 | Dubrow et al. | | |
| 2012/0238041 A1* | 9/2012 | Paolini | ............... | H01L 33/508 438/7 |
| 2016/0190105 A1* | 6/2016 | Rhee | ............... | H01L 25/0753 257/76 |
| 2018/0329258 A1* | 11/2018 | Ajichi | ............... | H01L 25/0753 |

FOREIGN PATENT DOCUMENTS

| | | |
|---|---|---|
| JP | 2012-199041 A | 10/2012 |
| JP | 2012-242682 A | 12/2012 |
| JP | 2013-004263 A | 1/2013 |
| JP | 2013-068905 A | 4/2013 |
| JP | 2013-544018 A | 12/2013 |

OTHER PUBLICATIONS

Written Opinion issued in PCT/JP2016/056765 dated May 24, 2016.
International Preliminary Report on Patentability issued by WIPO dated Sep. 21, 2017, in connection with International Patent Application No. PCT/JP2016/056765.

* cited by examiner

FIG. 3

| A | B | C |
|---|---|---|
| D | E | F |
| G | H | I |

FIG. 4

| ○ 1A | ○ 1B | ○ 1C |
|---|---|---|
| ○ 1D | ○ 1E | ○ 1F |
| ○ 1G | ○ 1H | ○ 1I |

| 2 | 5 | 10 | 20 | 100 | 20 | 10 | 5 | 2 | 1 | 0 | | 0 |
|---|---|----|----|-----|----|----|---|---|---|---|---|---|
| | | | 0 | | | | 0 | | | | | 0 |
| | | | 0 | | | | 0 | | | | | 0 |

FIG. 7

NON-LD (BACKLIGHT UNIT)

| 100.0 | 100.0 | 100.0 |
|---|---|---|
| 100.0 | 100.0 | 100.0 |
| 100.0 | 100.0 | 100.0 |

FIG. 8

LD-01 (BACKLIGHT UNIT)

| 100.0 | 5.0 | 0 |
|---|---|---|
| 0 | 0 | 0 |
| 0 | 0 | 0 |

FIG. 9

LD-02 (BACKLIGHT UNIT)

| 100.0 | 5.0 | 0 |
|---|---|---|
| 5.0 | 0 | 0 |
| 0 | 0 | 0 |

FIG. 10

LD-03 (BACKLIGHT UNIT)

| 100.0 | 5.0 | 1.0 |
|---|---|---|
| 5.0 | 1.0 | 0 |
| 1.0 | 0 | 0 |

FIG. 11

NON-LD (BACKLIGHT UNIT)

| 102.3 | 103.6 | 102.3 |
|-------|-------|-------|
| 103.6 | 105.2 | 103.6 |
| 102.3 | 103.6 | 102.3 |

FIG. 12

LD-01 (BACKLIGHT UNIT)

| 100.1 | 6.0 | 0.1 |
|-------|-----|-----|
| 1.0   | 0.4 | 0.1 |
| 0.1   | 0.1 | 0.1 |

FIG. 13

LD-02 (BACKLIGHT UNIT)

| 100.1 | 6.0 | 0.1 |
|---|---|---|
| 6.0 | 0.4 | 0.1 |
| 0.1 | 0.1 | 0.1 |

FIG. 14

LD-03 (BACKLIGHT UNIT)

| 100.1 | 6.0 | 1.1 |
|---|---|---|
| 6.0 | 1.4 | 0.1 |
| 1.1 | 0.1 | 0.1 |

BACKLIGHT UNIT AND IMAGE DISPLAY DEVICE

CROSS-REFERENCE TO RELATED APPLICATIONS

This application is a Continuation of PCT International Application No. PCT/JP2016/056765 filed on Mar. 4, 2016, which was published under PCT Article 21(2) in Japanese and claims priority under 35 U.S.C § 119(a) to Japanese Patent Application No. 2015-045113 filed on Mar. 6, 2015. The above applications are hereby expressly incorporated by reference, in their entirety, into the present application.

BACKGROUND OF THE INVENTION

1. Field of the Invention

The present invention relates to a backlight unit and an image display device provided with the backlight unit.

2. Description of the Related Art

Most of image display devices such as a liquid crystal display device include at least a backlight unit and an image display unit.

As such a backlight unit, a backlight unit including a white light source such as a white light-emitting diode (LED) has been widely used as a light source. However, in recent years, instead of the white light source, for example, a new backlight unit that realizes white light using light emitted from a light source such as a blue LED and light emitted in a wavelength conversion member (including at least a wavelength conversion layer) that includes a fluorescent body excited by the light emitted from the light source and emits fluorescence and is disposed as a member that is different from the light source has been proposed (see JP2013-544018A).

Further, with respect to a drive control of a backlight unit, a technique called as a local dimming control for locally reducing backlight brightness according to an image displayed on a display surface of an image display unit has been proposed (see JP2004-212503A and JP2012-199041A).

SUMMARY OF THE INVENTION

In the backlight unit disclosed in JP2013-544018A, more specifically, white light is realized as follows, for example.

Light emitted from a light source unit including a light source is incident to a wavelength conversion member that is disposed on an optical path of the light. In the light incident to the wavelength conversion member, light absorbed into a fluorescent body in a wavelength conversion layer excites the fluorescent body, and light that is not absorbed into the fluorescent body and passes through the wavelength conversion layer is emitted out of the wavelength conversion member (emission light that is generated from the light source).

Further, the excited fluorescent body emits light (fluorescence) having a wavelength different from that of the incident light. For example, in a case where a fluorescent body (a green fluorescent body) that emits green light is used as a fluorescent body, the green light is emitted from the wavelength conversion member, and in a case where a fluorescent body (a red fluorescent body) that emits red light is used, the red light is emitted from the wavelength conversion member. Thus, it is possible to obtain emission light (different emission light) having a wavelength different from that of the emission light that is generated from the light source, from the wavelength conversion member. Further, by color-mixing the different emission light obtained in this way and the emission light that is generated from the light source (for example, by color-mixing the green light and red light which serve as the different emission light each other and the blue light which serves as the emission light that is generated from the light source), it is possible to realize white light. Furthermore, by selecting an appropriate material as the fluorescent body used for the wavelength conversion layer, it is possible to control a wavelength band of emission light obtained from the fluorescent body, and to control a half-width to become narrow. Thus, it is possible to obtain monochromatic light with high color purity as the emission light from the fluorescent body. As a result, it is possible to reduce emission light absorbed by a color filter in the related art. The above-described points are effective in enhancement of display brightness on a display surface of an image display device and enlargement of a color reproduction region.

On the other hand, according to the local dimming control disclosed in JP2004-212503A and JP2012-199041A, by locally reducing or turning off light emitted toward an area to be displayed to be darker than other portions, in light emitted from a backlight unit to an image display unit, it is possible to locally lower backlight brightness, and thus, it is possible to lower the brightness of black display of the area to be darkly displayed. By controlling the backlight brightness for each area in this way, it is possible to enlarge a difference of brightness and darkness between an area to be darkly displayed and an area to be brightly displayed. Thus, it is possible to enhance contrast of an image displayed on a display surface of the image display device (to display a clear image). Further, by locally reducing or turning off light from a light source, it is also possible to reduce power consumption of the backlight unit.

As described above, the backlight unit provided with the wavelength conversion member and the backlight unit capable of performing the local dimming control have different advantages, respectively.

Thus, the present inventors reviewed a configuration in which these two techniques are combined to form a backlight unit. In an image display device provided with such a backlight unit, it was found that a phenomenon that a portion to be darkly displayed is tinted (for example, a phenomenon that chromatic coordinates (chromaticity) of white light in a portion to be darkly displayed deviates from chromatic coordinates (chromaticity) of white light in a portion to be brightly displayed in an image) occurred. In order to enhance image quality of an image displayed on a display surface, it is desirable to reduce such tinting.

Accordingly, an object of the invention is to provide means for reducing tinting in a portion to be darkly displayed, in an image display device having a backlight unit that is provided with a wavelength conversion member and is capable of performing a local dimming control.

According to an aspect of the invention, there is provided a backlight unit capable of controlling a backlight brightness for each of areas, comprising: a light source unit; and a wavelength conversion member that is disposed on an optical path of light emitted from the light source unit, in which the wavelength conversion member includes a wavelength conversion layer including at least a fluorescent body that is excited by excitation light and emits green light and a fluorescent body that is excited by excitation light and emits red light, the light source unit includes a light source allocated to each of the areas, a control of the backlight brightness for each area is performed by controlling a light emission intensity of each light source allocated to each area independently of a light emission intensity of a light source allocated to a different area, and a light source allocated to at least one area includes a light source group including two or more kinds of light sources having different light emission maximum wavelengths, and a light emission intensity of at least one kind of light source included in the light source group is capable of being controlled independently of a light emission intensity of a different light source included in the light source group.

In the invention and in the present specification, the control of the backlight brightness for each area refers to a control for individually changing brightness (backlight brightness) of emission light emitted from an emission-side outermost surface of the backlight unit in each in-plane region (that is, for each area) of the emission-side outermost surface. Such a control is known as the above-described local dimming control. Here, it is assumed that the change includes increasing the brightness of the emission light, decreasing the brightness of the emission light, and turning off the emission light. The areas do not refer to regions that are definitely divided by a boundary line or the like, but refer to regions in which backlight brightness is controlled by the local dimming control (hereinafter, referred to as a "control unit"). Further, the emission side refers to an image display unit side in a case where the backlight unit is disposed in an image display device. A side opposite to the emission side is referred to as an incidence side. With respect to the wavelength conversion member, a light source unit side becomes the incidence side. The emission-side outermost surface of the backlight unit refers to an emission-side surface of a member disposed on an outermost emission-side of the backlight unit, and is not limited to an emission-side surface of the wavelength conversion member. Further, the control of the backlight brightness for each area in the backlight unit is performed by controlling a light emission intensity of each light source allocated to each area independently of a light emission intensity of a light source allocated to a different area. The independent control of the light emission intensity of the light source refers to a control capable of adjusting a light emission intensity of a certain light source independently of a light emission intensity of a different light source. For example, the independent control of the light emission intensity of the light source includes a control for individually changing light emission intensities of respective light sources according to different input signals or different control mechanisms. In addition, the change of the light emission intensity means at least one of increasing or decreasing a light emission intensity in a continuous manner or in stages, turning off a light source, or turning on the light source.

Details of the above-described control will be described later.

In one aspect, each light source allocated to each area includes a light source group including two or more kinds of light sources having different light emission maximum wavelengths, and a light emission intensity of at least one kind of light source included in the light source group is capable of being controlled independently of a light emission intensity of a different light source included in the light source group.

In one aspect, the light emission maximum wavelengths of the light sources included in the light source group are in a range from a blue light wavelength band to an ultraviolet light wavelength band.

In one aspect, the light source is a light emitting diode, and the wavelength conversion member is a sheet shaped member.

In one aspect, the backlight unit further comprises at least one member having a reflective characteristic on at least one of an emission side of the wavelength conversion member or a light source unit side thereof.

In one aspect, the member having the reflective characteristic includes at least one sheet shaped member.

According to another aspect of the invention, there is provided an image display device comprising: the backlight unit; an image display unit; and a local dimming control unit.

In one aspect, the local dimming control unit creates light source light emission intensity information for each area of the backlight unit on the basis of display brightness information for each area of an image to be displayed on a display surface of the image display unit, and determines a light emission intensity of each light source included in a light source group including two or more kinds of light sources having different light emission maximum wavelengths on the basis of the created light source light emission intensity information or on the basis of corrected light source light emission intensity information obtained by performing a correction process based on the influence of leaked light that is generated from a light source allocated to a different area of the backlight unit with respect to the created light source light emission intensity information, and each light source included in the light source group emits light having the determined light emission intensity.

In one aspect, the correction process based on the influence of the leaked light that is generated from the light source allocated to the different area of the backlight unit includes, as the influence of the leaked light becomes larger, among two or more kinds of light sources included in the light source group, (1) a process of increasing an absolute value or a relative value of a light emission intensity of a light source of which a light emission maximum wavelength is positioned on a long wavelength side, (2) a process of decreasing an absolute value or a relative value of a light emission intensity of a light source of which a light emission maximum wavelength is positioned on a short wavelength side, or (3) a process of increasing the absolute value or the relative value of the light emission intensity of the light source of which the light emission maximum wavelength is positioned on the long wavelength side and decreasing the absolute value or the relative value of the light emission intensity of the light source of which the light emission maximum wavelength is positioned on the short wavelength side. Here, the "relative value" refers to values relating to light emission intensities of light sources having different light emission maximum wavelengths each other. For example, when absolute values of a light emission intensity of a light source of which a light emission maximum wavelength is positioned on a long wavelength side and a light emission intensity of a light source of which a light emission maximum wavelength is positioned on a short wavelength side are respectively decreased but an intensity ratio between the light emission intensity of the light source of which the light emission maximum wavelength is positioned on the long wavelength side and the light emission intensity of the light source of which the light emission maximum wavelength is positioned on the short wavelength side "(the light emission intensity of the light source of which the light emission maximum wavelength is positioned on the long wavelength side)/(the light emission intensity of the light source of which the light emission maximum wavelength is positioned on the short wavelength side)" is increased, the relative value of the light emission intensity of the light source of which the light emission maximum wavelength is positioned on the long wavelength side is increased. Hereinafter, unless there is a particular description, it is assumed that the increase or decrease of the light emission intensity relates to an absolute value or a relative value, as described above.

The above-described areas relating to an image do not refer to regions that are definitely divided by a boundary line or the like. With respect to an image displayed on the image display unit, a region in which display brightness information is created by the local dimming control unit is referred to as an area.

In one aspect, the image display unit includes a pair of electrodes and a liquid crystal cell disposed between the electrodes, the local dimming control unit creates liquid crystal control information for each area of the liquid crystal cell on the basis of the display brightness information for each area of the image to be displayed on the display surface of the image display unit, and determines a voltage application condition for each area of the liquid crystal cell on the basis of the created liquid crystal control information or on the basis of corrected liquid crystal control information obtained by performing a correction process based on the corrected light source light emission intensity information with respect to the created liquid crystal control information, and the pair of electrodes applies a voltage to the liquid crystal cell under the determined voltage application condition.

The above-described areas relating to the liquid crystal cell do not refer to regions that are definitely divided by a boundary line or the like. With respect to the liquid crystal cell, a region in which a voltage application condition is set is referred to as an area.

In one aspect, the correction process based on the influence of the leaked light that is generated from the light source allocated to the different area of the backlight unit includes a process of setting a light emission intensity of at least one of a light source allocated to a portion that is greatly affected by leaked light or a light source allocated to a different portion in the same area to be different from a value determined by the light source light emission intensity information.

According to the invention, in an image display device including a backlight unit that includes a wavelength conversion member and is capable of performing a local dimming control, it is possible to reduce tinting of a portion to be darkly displayed.

BRIEF DESCRIPTION OF THE DRAWINGS

FIG. 3 is a diagram showing an example of an area arrangement where the backlight brightness control is performed.

FIG. 4 is a diagram showing a light source arrangement according to Comparative Example 1.

FIG. 7 is a diagram for describing Example 1 (initial setting values of light source light emission intensity information in non-local dimming (LD) (reference), which will be described later).

FIG. 8 is a diagram for describing Example 1 (initial setting values of light source light emission intensity information in LD-01, which will be described later).

FIG. 9 is a diagram for describing Example 1 (initial setting values of light source light emission intensity information in LD-02, which will be described later).

FIG. 10 is a diagram for describing Example 1 (initial setting values of light source light emission intensity information in LD-03, which will be described later).

FIG. 11 is a diagram showing a measurement result of backlight brightness in a non-LD (reference) state in Example 1.

FIG. 12 is a diagram showing a measurement result of backlight brightness in an LD-01 state (where a correction process is terminated) in Example 1.

FIG. 13 is a diagram showing a measurement result of backlight brightness in an LD-02 state (where a correction process is terminated) in Example 1.

FIG. 14 is a diagram showing a measurement result of backlight brightness in an LD-03 state (where a correction process is terminated) in Example 1.

DESCRIPTION OF THE PREFERRED EMBODIMENTS

Figure 1:
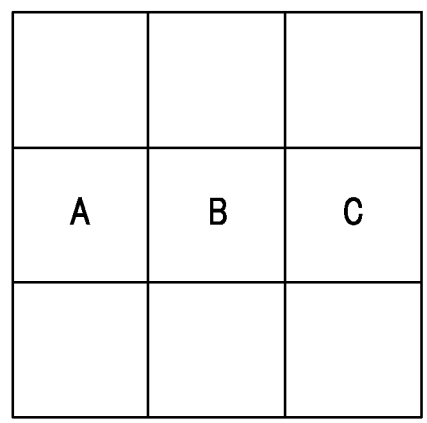
FIG. 1 is a diagram showing an area arrangement where a backlight brightness control for each area is performed in an embodiment.

The following description is made on the basis of representative embodiments of the invention, but the invention is not limited to the embodiments. In the invention and the present specification, a numerical value range represented using "to" means a range including numerical values written before and after "to" as a lower limit value and an upper limit value.

Further, expressions relating to directions such as a "longitudinal (direction)" and a "transverse (direction)" mean directions in a case where a backlight unit is disposed in an image display device with respect to the backlight unit and components of the backlight unit. It is considered that an angle relationship (for example, "orthogonal" or the like) includes a range of an error allowed in a technical field to which the invention belongs. For example, it means that the error is within a range of an angle less than ±10° from a strict angle. The error from the strict angle is preferably 5° or smaller, and is more preferably 3° or smaller.

[Backlight Unit]

An aspect of the invention relates to a backlight unit capable of controlling a backlight brightness for each of areas, including: a light source unit; and a wavelength conversion member that is disposed on an optical path of light emitted from the light source unit, in which the wavelength conversion member includes a wavelength conversion layer that includes at least a fluorescent body that is excited by excitation light and emits green light and a fluorescent body that is excited by excitation light and emits red light, the light source unit includes a light source allocated to each of the areas, control of the backlight brightness for each area is performed by controlling a light emission intensity of each light source allocated to each area independently of a light emission intensity of a light source allocated to a different area, and a light source allocated to at least one area includes a light source group including two or more kinds of light sources having different light emission maximum wavelengths, and a light emission intensity of at least one kind of light source included in the light source group can be controlled independently of a light emission intensity of a different light source included in the light source group.

The present inventors continued the review for achieving the above-described object, and found that the above-described tinting occurred due to the following cause.

In a backlight unit in which a wavelength conversion member having a wavelength conversion layer including at least a green fluorescent body and a red fluorescent body is disposed on an optical path of light emitted from a light source unit, as described above, by color-mixing emission light that is generated from a light source and fluorescence (different emission light) from a green fluorescent body and a red fluorescent body included in a wavelength conversion layer, it is possible to realize white light. Here, under the local dimming control, in a case where a light emission intensity of a light source that emits light toward a certain area (hereinafter, referred to as a "low brightness area") is set to be lower than a light emission intensity of a light source that emits light toward a different area, it is possible to reduce the emission light that is generated from the light source and the different emission light in the low brightness area. Thus, it is possible to lower the backlight brightness in the low brightness area than that in the different area. Alternatively, it is also possible to also turn off a light source for irradiation of the low brightness area in which the backlight brightness is set to zero (or to be close to zero) in the low brightness area.

Here, the different area includes an area (hereinafter, referred to as a "high brightness area) having a backlight brightness higher than that of the low brightness area. Further, a light source for irradiation of the high brightness area emits light at a light emission intensity higher than that of a light source for irradiation the low brightness area. Both of emission light that is generated from the light source and different emission light emitted from a fluorescent body in the high brightness area (green light and red light emitted from the fluorescent body) are emitted from the high brightness area, but a part of the two types of light is leaked and enters into the low brightness area. From the leaked light incident to the low brightness area in this way, the emission light that is generated from the light source allocated to the high brightness area excites the green fluorescent body and the red fluorescent body in the low brightness area. As a result, the light intensity of the different emission light in the low brightness area increases compared with a case where the leaked light is not considered. In this way, as a percentage of the red light and the green light in color mixing of the emission light that is generated from the light source and the different emission light increases, it is considered that chromatic coordinates (chromaticity) of the emission light emitted from the low brightness area deviate from white color and become yellowish due to the color mixing of the red light and the green light. Alternatively, in a case where the light source for irradiation of the low brightness area in which the backlight brightness is set to zero (or to be close to zero) is turned off, the leaked light is incident to the wavelength conversion layer regardless of whether the light source is turned off, and the fluorescent body emits the green light and the red light in the low brightness area. As a result, it is considered that yellowish light exits from the low brightness area.

The present inventors estimated that such a phenomenon was a cause of why a portion to be darkly displayed was tinted, as described above. In the backlight unit, in many cases, a member having reflectivity is provided on an emission side or an incidence side of a wavelength conversion member. The present inventors thought that as such a reflective member reflected light that was not absorbed into the fluorescent body and passed through the wavelength conversion member in the light emitted from the light source, multiple reflection was repeated in the backlight unit, so that tinting due to the leaked light became more noticeable. In the invention and the present specification, "the leaked light that is generated from the light source allocated to the different area" means one or both of incident light that is emitted from the light source allocated to the different area (for example, the high brightness area) and then is incident to a certain area (for example, the low brightness area), for example, by scattering in the wavelength conversion member and light that is emitted from the light source allocated to the different area and is incident due to reflection in the backlight unit. In the following description, the leaked light that is generated from the light source allocated to the different area is also written as the leaked light from the different area.

Further, the present inventors focused on a light emission characteristic of a fluorescent body having a tendency that the light emission intensity becomes stronger as excitation light becomes light having a shorter wavelength and becomes weaker as the excitation light becomes light having a longer wavelength, with respect to light emission of the fluorescent body represented as quantum dots (details of which will be described later). The present inventors considered that the tinting would be reduced using the light emission characteristic of the fluorescent body. Details are as follows. As described above, it is considered that the tinting in the low brightness area occurs as emission light becomes yellowish by mixture of green light and red light emitted due to the influence of leaked light. Thus, the present inventors considered a method of emitting bluish light and mixing the bluish light with yellowish light in the low brightness area, a method of reducing yellow tints by reducing the intensities of red light and green light, or a method of reducing the tinting by performing both of the two methods.

The inventors more intensively performed the review on the basis of the above-described knowledge, and as a result, found that in a case where the above-described emission characteristic of the fluorescent body was used, two or more kinds of light sources having different light emission maximum wavelengths could be used as a light source for irradiation of a low brightness area, to thereby reduce tinting. Specifically, for example, in a case where light is emitted from two types of light sources having different light emission maximum wavelengths, since light emitted from a light source that emits light having a shorter wavelength among the two types of light sources relatively increases the light emission intensities of green light and red light from a fluorescent body, strong yellowish white light may be generated by mixture of the green light and the red light. Further, contrarily, since light emitted from a light source that emits a longer wavelength relatively decreases the light emission intensities of the green light and the red light from the fluorescent body, weak yellowish color, that is, more bluish white light (bluish light) may be generated due to mixture of the green light and the red light. Further, by adjusting the light emission intensities of the two types of light sources, it is possible to change the ratio of strong yellowish white light and strong bluish white light, and thus, it is possible to remove or reduce tinting (yellow tints) of emission light emitted from a low brightness area in a backlight unit. Even in a case where three types or more light sources are used, similarly, it is possible to remove or reduce yellow tints of emission light emitted from a low brightness area in a backlight unit by changing the ratio of color mixing. In addition, the removal or reduction of tinting cannot be performed in a backlight unit in which only one type of light source is allocated to an area where a local dimming control is performed.

On the other hand, in the backlight unit of the invention, a light source allocated to at least one area among light sources allocated to each area in which backlight brightness is controlled includes a light source group (hereinafter, also referred to as a "multi-wavelength heterogeneous light source group") that includes two or more kinds of light sources having different light emission maximum wavelengths, and the light emission intensity of at least one kind of light source included in the multi-wavelength heterogeneous light source group can be controlled independently of the light emission intensity of a different light source included in the light source group, and thus, it is possible to remove or reduce the above-described tinting. In this way, the present inventors estimated that it was possible to reduce tinting in a portion to be darkly displayed that occurs due to the influence of leaked light.

Here, the above description is the present inventor's estimation, and does not particularly limits the invention.

Hereinafter, the backlight unit will be described in detail.

<Wavelength Conversion Member>

A wavelength conversion member includes at least a wavelength conversion layer. The wavelength conversion layer is a layer capable of emitting light having a wavelength different from a wavelength of light which is incident to the layer (capable of performing wavelength conversion). The wavelength conversion member of the backlight unit includes a green fluorescent body and a red fluorescent body in the wavelength conversion layer, and can arbitrarily emit green light, red light. Further, the wavelength conversion member arbitrarily includes a blue fluorescent body, and arbitrarily emits blue light. White light is obtained as emission light from the backlight unit that includes the wavelength conversion member having such a wavelength conversion layer, and details thereof is as described above.

(Fluorescent Body)

As the fluorescent body included in the wavelength conversion layer, various fluorescent bodies which are excited by excitation light and can emit fluorescence may be used without any limitation. Normally, the fluorescent body may emit fluorescence of a single peak in which a light emission maximum wavelength is a light emission central wavelength. By mixing monochromatic light having such a single peak, as described above, it is possible to realize white light. As a preferable fluorescent body, a quantum dot (QD) or a quantum rod which is a fluorescent body that uses a discrete energy level by a quantum confinement effect may be used. In the quantum dot, fluorescence that is excited by excitation light and emits light is polarized light, whereas in the quantum rod, fluorescence that is excited by excitation light and emits light is light that does not have a polarization characteristic (referred to as omnidirectional light or unpolarized light). Since the quantum dot and the quantum rod have a small half-width of fluorescence for light emission compared with fluorescence emitted from a different fluorescent body, white light obtained using light emission thereof is excellent in excellent color reproducibility, to thereby provide a preferable fluorescent body. The half-width of fluorescence emitted by the quantum dot and the quantum rod is preferably 100 nm or smaller, more preferably 80 nm or smaller, more preferably 50 nm or smaller, more preferably 45 nm or smaller, and most preferably 40 nm or smaller. The emission wavelengths of the quantum dot and the quantum rod may be generally adjusted by compositions, sizes, or compositions and sizes.

The quantum dot is a semiconductor crystal (semiconductor nanocrystal) particle having a nano-order size, a particle obtained by qualifying a semiconductor nanocrystal surface with organic ligands, a particle obtained by qualifying a semiconductor nanocrystal surface with an inorganic component, or a particle by coating a semiconductor nanocrystal surface with a polymer layer. The quantum dot may be composed by a known method, and may be obtained as commercial goods. With respect to details thereof, refer to US2010/123155A1, JP2012-509604A, U.S. Pat. No. 8,425,803B, JP2013-136754A, WO2005/022120A, JP2006-521278A, JP2010-535262A, JP2010-54070A, or the like, for example.

On the other hand, with respect to the quantum rod, for example, refer to paragraphs 0005 to 0032 and 0049 to 0051 in JP2014-502403A, U.S. Pat. No. 7,303,628B, a treatise (Peng, X. G: Manna, L.; Yang, W. D.; Wickham, j.; Scher, E.; Kadavanich, A.; Alivisatos, A. P. Nature 2000, 404, 59-61), and a treatise (Manna, L.; Scher, E. C.; Alivisatos, A. P. j. Am. Chem. Soc. 2000, 122, 12700-12706). Further, the quantum rod may be obtained as commercial goods.

(Arbitrary Configuration of Wavelength Conversion Member)

Normally, the wavelength conversion layer is a layer that includes the above-described fluorescent body in a matrix. A manufacturing method of the wavelength conversion layer is not particularly limited. For example, it is possible to obtain a wavelength conversion layer as a curable layer formed by performing polymerization treatment after coating a polymerizable composition including a polymerizable compound together with a fluorescent body and arbitrarily including one or more kinds of additives such as a polymerization initiator on an appropriate base material. Further, the wavelength conversion member may have an arbitrary shape such as a sheet shape, a film shape, or a bar shape. Furthermore, the wavelength conversion member may be configured by only the wavelength conversion layer, or may be configured by one or more arbitrary members such as a base material or a barrier film. With respect to the members that may be arbitrarily included, for example, refer to JP2013-544018A, or the like.

The wavelength conversion member may include a scattering member as at least one of the members that may be arbitrarily included. It is preferable that the wavelength conversion member includes the scattering member in terms of enhancement of backlight brightness. Further, it is possible to perform efficient wavelength conversion by including the scattering member, and thus, it is also possible to reduce the amount of a fluorescent body for realizing the same backlight brightness. In one aspect, absorption at a wavelength of 450 nm that occurs from the fluorescent body in the wavelength conversion member is preferably 0.005 to 0.200 in absorbance, and more preferably 0.010 to 0.100 as an absorbance. The absorbance may be obtained by calculating content per unit area of a fluorescent body included in a wavelength conversion member which is a measurement target using a known composition analysis method, and calculating an absorbance due to the fluorescent body using a measurement sample obtained by mixing the fluorescent body corresponding to the calculated content with an arbitrary resin (binder) and coating a support with the mixture. It is preferable to use a resin and a support having an absorbance of zero as the binder and the support.

Here, in a case where the scattering member is included in the wavelength conversion member, in a case where leaked light that is generated from a light source allocated to a different area is incident to a certain area, the incident leaked light is diffused in the wavelength conversion member so that a probability that the leaked light is absorbed into a fluorescent body increases, and thus, the light intensities of green light and red light (different emission light) emitted from the fluorescent body further increase. As a result, tinting easily occurs in a portion to be darkly displayed under the local dimming control, and tinting is more easily noticeable. On the other hand, in the backlight unit of the invention, as described above, it is possible to remove or reduce the above-mentioned tinting by using the multi-wavelength heterogeneous light source group.

The scattering member may be a wavelength conversion layer in one aspect, and may be a member that is directly connected to a wavelength conversion layer or a member that is indirectly connected thereto through a different layer in another aspect. In any aspect, a scattering characteristic may be provided by a known method such as a refractive index difference on an interface on which members having different refractive indexes are layered, formation of irregularities on an interface between two layered members, or addition of particles to a portion to be given the scattering characteristic. The scattering characteristic may be provided with respect to light emitted from at least a light source, and may also be provided with respect to light of a wavelength band other than the light emitted from the light source. Further, the scattering member may be included in a barrier film, for example. For example, in a case where the barrier film is a layered film obtained by layering one or more layers on a base material film, the base material film may serve as the scattering member, or the layered film may serve as the scattering member. Alternatively, an adhesion improving layer (for example, an adhesive layer or the like) for improving adhesion between the wavelength conversion layer and the barrier film may serve as the scattering member. In addition, the scattering member may be provided as a separate layer or film other than the wavelength conversion layer, the barrier film, and the adhesion improving layer.

In the wavelength conversion member including the scattering member as described above, a haze is preferably 20% or greater, more preferably 40% or greater, and most preferably 60% or greater and 100% or smaller. Here, the haze is a value measured according to JIS-K7136. For the measurement, for example, Haze Meter NDH2000 made by Nippon Denshoku Industries Co., Ltd, may be used.

In order to efficiently perform wavelength conversion by a small amount of fluorescent body, it is preferable that the wavelength conversion member has a sheet shape in order to effectively excite a fluorescent body using an arbitrary member of a backlight unit (which will be described later). In the invention and the present specification, the sheet shape may have the same meaning of a film shape.

<Light Source Unit>

A light source unit includes a light source allocated to each area where backlight brightness is controlled. The backlight unit is divided into a directly-under type and an edge-light type according to a configuration of the light source unit. A light source unit of the directly-under type backlight unit generally includes at least a member having a reflective characteristic (hereinafter, referred to as a reflective member), plural light sources that are disposed on the reflective member, and a diffusion member that diffuses and emits light emitted from the light sources (normally, referred to as a diffusion plate, a diffusion sheet, or the like). On the other hand, in a light source unit of the edge-light type backlight unit, normally, a light source is disposed on a side surface of a light guide member (normally, referred to as a light guide plate), and a reflective member is disposed on a side opposite to an emission surface side of the light guide member. Further, a diffusion member may be disposed on the emission surface side of the light guide member. In the invention and the present specification, the member having the reflective characteristic (reflective member) refers to a member having a reflective characteristic with respect to light emitted from at least a light source, and may also have a reflective characteristic with respect to light of a wavelength band other than the light emitted from the light source. In addition, the reflective characteristic means that a reflection phenomenon is shown with respect to at least a part of light incident to a certain member. Here, the reflection phenomenon may be any one of mirror surface reflection, diffusion reflection, and retro-reflection.

The light source allocated to each area where backlight brightness is controlled refers to a light source of which a light emission intensity is controlled under the local dimming control, as a light source that emits light incident to a target area. For example, in the directly-under type backlight unit, the light source allocated to each area is a light source disposed at the back of a target area (that is, an incidence side). Further, in the edge-light type backlight unit, the light source allocated to each area is a light source that emits light to be incident to a portion positioned at the back of a target area (that is, an incidence side) of a light guide member, among light sources disposed side surface sides of the light guide member. The backlight unit of the invention may be the directly-under type the backlight unit or the edge-light type backlight unit. In addition, in recent years, a backlight unit that performs area division using a divided light guide member called a modular type has also been proposed, but the backlight unit of the invention may be such a modular type. Alternatively, the two or more kinds of the directly-under type, the edge-light type, and the modular type may be used in combination. The directly-under type backlight unit is preferable in terms of easiness of the local dimming control.

In the backlight unit, a light source allocated to at least one area among the light sources allocated to each area where backlight brightness is controlled includes a light source group (multi-wavelength heterogeneous light source group) including two or more kinds of light sources having different light emission maximum wavelengths, and a light emission intensity of at least one kind of light source included in the multi-wavelength heterogeneous light source group can be controlled independently of a light emission intensity of a different light source included in the light source group. On the other hand, in a backlight unit capable of performing a local dimming control in the related art, a light source allocated to each area does not include the above-described multi-wavelength heterogeneous light source group in which a light emission intensity can be independently controlled. In the above-described backlight unit, since the light sources allocated to the same area have different light emission maximum wavelengths and the light emission intensity can be independently controlled for each light source as described above, it is possible to increase a light emission intensity of a light source of which a light emission maximum wavelength is located on a long wavelength side, to decrease a light emission intensity of a light source of which a light emission maximum wavelength is located on a short wavelength side, or to perform the both, as described above. The present inventors estimated that it is possible to remove or reduce tinting generated due to the influence of leaked light in this way.

The light sources included in the multi-wavelength heterogeneous light source group are at least two light sources having different light emission maximum wavelengths. The number of light sources included in the multi-wavelength heterogeneous light source group may be, for example, about 100 to 10,000. The number of light sources is generally about 2 to 64 or about 2 to 32, but it is not particularly limited. The number of light sources may be appropriately set according to the number of areas where backlight brightness is controlled or the size of the display surface.

Each type of light source among two or more kinds of light sources that form the multi-wavelength heterogeneous light source group may be a single light source (for example, one light emitting diode (LED) or laser light source), or may be a light source group including two or more light sources having the same light emission maximum wavelength. The number of light sources included in each type of light source among the two or more kinds of light sources that form the multi-wavelength heterogeneous light source group is 1 or more, but the number of light sources having a certain light emission maximum wavelength may be the same as the number of light sources having a different light emission maximum wavelength, or may be different therefrom. With respect to two or more light sources having the same light emission maximum wavelength, each light emission intensity may be independently controlled, or the respective light emission intensities may be controlled in connection.

In the above-described backlight unit, the light source allocated to at least one area may include the above-described multi-wavelength heterogeneous light source group in which light emission intensities can be independently controlled. Thus, as described above, it is possible to remove or reduce tinting generated due to the influence of leaked light in light emitted from an area to which such a light source group is allocated. Further, in a backlight unit in which a local dimming control is performed, in an image display device in which the backlight unit is assembled, a portion to be brightly displayed and a portion to be darkly displayed are frequently changed according to change in an image on a display surface. Accordingly, in order to reduce tinting in an area which corresponds to the portion to be darkly displayed according to such change in the image, it is preferable that the number of areas where a light source allocated thereto includes the above-described multi-wavelength heterogeneous light source group in which light emission intensities can be independently controlled becomes large, and it is more preferable that the light source allocated to each area where backlight brightness is independently controlled (that is, all light sources allocated to all the areas) includes the above-described multi-wavelength heterogeneous light source group in which the light emission intensities can be independently controlled. In addition, there is also a case in which leaked light that is generated from a light source allocated to a low brightness area enters a high brightness area. From a viewpoint of reduction of the influence of such leaked light, it is preferable that the number of areas to which the multi-wavelength heterogeneous light source group in which the light emission intensities can be independently controlled is allocated becomes large, and it is more preferable that all light sources allocated to all the areas is the above-described multi-wavelength heterogeneous light source group in which the light emission intensities can be independently controlled.

In one aspect, the two or more kinds of light sources have light emission maximum wavelength in a range from a blue light wavelength band to an ultraviolet light wavelength band. Here, in the invention and the present specification, light having a light emission maximum wavelength in a wavelength band of 430 to 490 nm is referred to as blue light, and light having a light emission maximum wavelength in a wavelength band of 300 nm or greater and smaller than 430 nm is referred to as ultraviolet light. Further, light having a light emission maximum wavelength in a wavelength band of 520 to 560 nm is referred to as green light, and light having a light emission maximum wavelength in a wavelength band of 600 to 680 nm is referred to as red light. The "half-width" of a peak represents the width of a peak at which the height of the peak is ½. Further, a light source that emits blue light as light of a single peak is referred to as a blue light source, and a light source that emits ultraviolet light as a single peak light as an ultraviolet light source. Here, the emission of the single peak light means that only one peak in which a light emission maximum wavelength is a light emission central wavelength is present, differently from a case where two or more peaks do not appear in an emission spectrum as in a white light source.

In the backlight unit, a fluorescent body (green fluorescent body) that is excited by excitation light and emits green light and a fluorescent body (red fluorescent body) that is excited by excitation light and emits red light are included. In a case where a blue light source is used as at least one kind of light source, by color-mixing blue light that is emitted from the blue light source, passes through a wavelength conversion layer and is then emitted from the backlight unit, green light emitted from the green fluorescent body, and red light emitted from the red fluorescent body, it is possible to obtain white light as light emitted from the backlight unit. Further, in a case where the wavelength conversion layer includes a fluorescent body (blue fluorescent body) that is excited by excitation light and emits blue light, in addition to the green fluorescent body and the red fluorescent body, although the light source does not include the blue light source, for example, since the ultraviolet light source is included as the light source, ultraviolet light becomes excitation light. Thus, it is possible to obtain white light as light emitted from the backlight unit by color-mixing the blue light that is emitted from the blue fluorescent body, the green light emitted from the green fluorescent body, and the red light emitted from the red fluorescent body. A fluorescent body has a characteristic of being excited by light of a wavelength shorter than that of an emission wavelength. Accordingly, it is not essential that the excitation light is light incident to the wavelength conversion layer from the outside of the wavelength conversion layer, and fluorescence emitted from a fluorescent body in the wavelength conversion layer may be used as excitation light.

In the multi-wavelength heterogeneous light source group, in order to excite at least a part of the fluorescent bodies included in the wavelength conversion layer, it is preferable that the light emission maximum wavelength of each light source is in a range from a blue light wavelength band to an ultraviolet light wavelength band. As a more preferable combination, for example, the following combinations may be used. In this way, by combining a light source that emits emission light of a shorter wavelength and a light source that emits emission light of a longer wavelength, as described above, it is possible to remove or reduce tinting under the control of a light emission intensity of at least one kind of light source included in the multi-wavelength heterogeneous light source group.

(1) A light emission maximum wavelength of at least one kind of light source is in a wavelength band of 365 to 460 nm, and a light emission maximum wavelength of at least one kind of light source is in a wavelength band of 430 to 490 nm, in which the former has a wavelength shorter than that of the latter.

(2) A light emission maximum wavelength of at least one kind of light source is in a wavelength band of 420 to 450 nm, and a light emission maximum wavelength of at least one kind of light source is in a wavelength band of 430 to 490 nm, in which the former has a wavelength shorter than that of the latter.

(3) A light emission maximum wavelength of at least one kind of light source is in a wavelength band of 365 to 430 nm, and a light emission maximum wavelength of at least one kind of light source is in a wavelength band of 430 to 490 nm, in which the former has a wavelength shorter than that of the latter.

(4) A light emission maximum wavelength of at least one kind of light source is in a wavelength band of 365 to 420 nm, and a light emission maximum wavelength of at least one kind of light source is in a wavelength band of 390 to 430 nm, in which the former has a wavelength shorter than that of the latter.

In a case where the multi-wavelength heterogeneous light source group includes two types of blue light sources having different light emission maximum wavelengths, the light emission maximum wavelengths of the two types of blue light sources are preferably different by 5 nm or greater, more preferably different by 10 nm or greater, and most preferably different by 15 to 40 nm.

Further, in an aspect in which the wavelength conversion layer includes the blue fluorescent body, the following combinations of light sources are also preferable.

(5) Light emission maximum wavelengths of two types of light sources are in a wavelength band of 300 to 420 nm, and the light emission maximum wavelengths of the two types of light sources are different by 5 nm or greater.

(6) A light emission maximum wavelength of at least one kind of light source is in a wavelength band of 300 to 380 nm, and a light emission maximum wavelength of at least one kind of light source is in a wavelength band of 365 to 430 nm, in which the former one has a wavelength shorter than that of the latter.

(7) A light emission maximum wavelength of at least one kind of light source is in a wavelength band of 300 to 430 nm, and a light emission maximum wavelength of at least one kind of light source is in a wavelength band of 430 to 490 nm, in which the former one has a wavelength shorter than that of the latter.

The light source is not particularly limited, but preferably, a light emitting diode (LED) or a laser light source is used. Preferably, the light emitting diode has a light emission maximum wavelength in a range from a blue light wavelength band to an ultraviolet light wavelength band. Particularly, a light emitting diode made of an indium gallium nitride (InGaN)-based material changes the amount of doped In to easily adjust a light emission characteristic, and thus, is preferably used.

Alternatively, as the light source, a light source (for example, a light source in which a surface of a light emitting diode is coated with a fluorescent body) obtained by combining a light emitting diode having a light emission maximum wavelength in a range of a wavelength band of blue light to a wavelength band of ultraviolet light with a fluorescent body such as a green fluorescent body, a yellow fluorescent body (a fluorescent body which is represented as a Yttrium Aluminum Garnet (YAG) fluorescent body having a half-width of about 50 to 150 mu at a light emission maximum wavelength of 520 to 600 nm), or a red fluorescent body may be used. In a light emitting spectrum of light emitted from such a light source, a peak also appears in a light emission central wavelength of a fluorescent body, in addition to a peak in which a light emission maximum wavelength of a light emitting diode is a light emission central wavelength.

A preferable light source is a blue light source or an ultraviolet light source that emits light of a single peak.

The light source unit may include various members that may be included in a normal backlight unit, in addition to the above-described light source. Members that may be included in the light source unit of the directly-under type backlight unit and the edge-light type backlight unit are as described above.

<Arbitrary Member of Backlight Unit>

The above-described backlight unit includes at least the light source unit and the wavelength conversion member described above, but may arbitrarily include one or more kinds of different members. Hereinafter, the various members that may be arbitrarily included will be described.

The backlight unit may include one or more members among a reflective member, a scattering member such as a scattering sheet, a member having a focusing function such as a prism sheet, a brightness enhancing film, or the like at an arbitrary position.

The reflective member may have different reflectances with respect to light rays having different light emission maximum wavelengths emitted from light sources included in the multi-wavelength heterogeneous light source group. Further, in order to entirely or partly adjust the reflectance in an in-plane area of the backlight unit, it is possible to provide a pattern of irregularities or the like in the reflective member by a known printing method. In a case where unevenness of a light intensity or a pattern thereof is formed in the surface of the backlight unit, it is possible to partly adjust reflection of incident light (excitation light) in the surface by printing the pattern using a coloring agent, a pigment, an ultraviolet absorber, or the like.

The scattering member is a scattering sheet in one aspect. Further, in another aspect, the scattering member may be an arbitrary member to which a scattering characteristic is given by the above-described known method for providing the scattering characteristic. A haze of such a scattering member is preferably 80% or greater, more preferably 90% or greater, and most preferably 95% or greater and 100% or smaller.

As the prism sheet, a known prism sheet such as a prism sheet having plural prism arrays disposed in parallel on one surface may be used. Further, for example, two prism sheets layered so that prism arrays cross each other at right angles with the prism arrays being directed in the same direction may be used. For example, in the backlight unit, these prism sheets may show a function for focusing light emitted from a wavelength conversion member on a liquid crystal panel side by disposing the prism arrays toward an emission side, on the emission side (a liquid crystal panel side in a case where disposed in a liquid crystal display device) with reference to the wavelength conversion member. It is preferable that each prism sheet has a small amount of absorption of fluorescence emitted from a fluorescent body or light emitted from a light source, and from this viewpoint, glass may be used as a material of the prism sheet. Here, the material is not limited to glass, and various resin materials may be preferably used as the material of the prism sheet.

As the brightness enhancing film, various members capable of enhancing the brightness of a display surface of a liquid crystal display device by application of the brightness enhancing film may be used. As an example of the brightness enhancing film, for example, a reflective polarizer may be used. Here, the reflective polarizer refers to a polarizer that transmits a light ray that oscillates in a specific polarization direction, among light rays that are incident while oscillating in all directions and reflects a light ray that oscillates in a different polarization direction.

All of the above-described various members may be manufactured by known methods, or may be available in the market. Most of scattering members and brightness enhancing films are reflective members having a reflective characteristic. The reflective member may be formed in a sheet shape in one aspect.

In a case where emission light emitted from a light source is reflected by a member having a reflective characteristic, in many cases, reflection or incidence is multiply repeated in a backlight unit. This contributes to efficient incidence of light emitted from the light source to the wavelength conversion layer, and thus, contributes to enhancement of a light emission intensity of fluorescence emitted using the light emitted from the light source as excitation light or fluorescence emitted from a different fluorescent body using the emitted fluorescence as excitation light. This is preferable in view of enhancement of backlight brightness. Further, it is also possible to reduce the amount of a fluorescent body for realizing the same backlight brightness. On the other hand, multiple repetition of reflection or incidence causes leaked light which becomes a cause of the above-described tinting. In this regard, the backlight unit of the invention can remove or reduce the tinting by independently controlling light emission intensities in the multi-wavelength heterogeneous light source group as described above.

The above-described backlight unit of the invention is appropriate as a backlight unit of an image display device that performs a local dimming control. Such an image display device will be described as follows.

[Image Display Device]

An aspect of the invention relates to an image display device including the above-described backlight unit, an image display unit, and a local dimming control unit.

<Backlight Unit>

The backlight unit is as described above.

<Local Dimming Control Unit>

The local dimming control unit may include various configurations, included in a known local dimming control mechanism, such as local dimming signal generation means for receiving information relating to an image displayed on a display surface of an image display unit and generating a local dimming signal based on the received information and local light intensity control means for receiving the local dimming signal from the local dimming signal generation means and performing a local light intensity control (for example, for reducing or turning off light from a part of light sources in a directly-under type backlight unit) of a light source on the basis of the received local dimming signal. For example, with respect to the local dimming control mechanism in the directly-under type backlight unit, refer to known techniques such as JP4914481B, JP2004-212503A, and with respect to the local dimming control mechanism in the edge-light type backlight unit, refer to known techniques such as JP2012-199041A.

The local dimming control is divided into a one-dimensional control and a two-dimensional control. The one-dimensional control is a method for performing area division in one direction such as a vertical direction or a horizontal direction to regulate control units. On the other hand, the two-dimensional control is a method for performing area division in two directions such as a vertical direction (longitudinal direction) and a horizontal direction (transverse direction) to regulate control units. In the one-dimensional control, generally, the number of control units is in a range of 2 to 64, preferably in a range of 3 to 32, and more preferably in a range of 4 to 32. On the other hand, in the two-dimensional control, a rectangular shape which is a planar shape of an emission-side outermost surface of a general backlight unit may be divided into 2 to 128 in a short-side direction (normally, in a longitudinal direction) and into 2 to 128 in a long-side direction (normally, in a transverse direction) to regulate control units. For example, in a case where area division into 2 is respectively made in a longitudinal direction and in a transverse direction, the number of control units becomes 4. Preferably, area division into 2 to 64 is made in the longitudinal direction and in the transverse direction, respectively, and more preferably into 4 to 32. In the following description, in a case where the number of divided areas in one direction in the two-dimensional control is A1 and the number of divided areas in the other direction is A2, this is denoted as (A1 division× A2 division). Area division may vary according to the size of a display surface of an image display device. For example, in the case of a TV of model 32 or greater, a 16 division control (4 division×4 division), a 32 division control (8 division×4 division), a 64 division control (8 division×8 division), a 128 division control (16 division×8 division), a 256 division control (16 division×16 division), a 512 division control (32 division×16 division), a 1024 division control (32 division× 32 division), a 2048 division control (64 division×32 division), or the like, may be used as preferable aspects. The shape of areas (control units) divided in the two-dimensional control may be a rectangular shape of which an aspect ratio is the same as an aspect ratio of the display surface of the image display device, but may be an arbitrary one type of shape such as a triangle, a rectangle, a pentagon, or a hexagon, or may be a combination of two or more kinds of such shapes. In a case displaying a general image, normally, a rectangular shape or a square shape is preferable. In a case where the rectangular shape or the square shape is used, it is possible to easily make an area in a backlight unit in which backlight brightness is controlled be associated with an area on the display surface in which display brightness is controlled, which is preferable. Further, in one aspect, the aspect ratio of the rectangular shape which is a quadrangle is in a range from 1 to 1.3, preferably in a range from 1 to 1.2, more preferably in a range from 1 to 1.1. The aspect ratio becomes more preferable as it is closer to 1. That is, the square is preferable. In addition, in the case of a hexagonal shape, a hexagon in which respective sides that face each other are parallel to each other is preferable. In the hexagonal shape, the ratio of a long side and a short side is preferably in a range from 1 to 1.3, more preferably in a range from 1 to 1.2, and much more preferably in a range from 1 to 1.1. Most preferably, the hexagon is a regular hexagon.

Preferably, the above-described information relating to the image displayed on the display surface of the image display unit is display brightness information for each area of the image. The display brightness refers to brightness of an image displayed on the display surface. Further, the local dimming control unit is able to create light source light emission intensity information for each area of a backlight unit as a local dimming signal. The light source light emission intensity information includes information relating to the number of light emission intensities to be set in a light source allocated to each area of a backlight unit on the basis of display brightness information, for example. For example, in the image display unit, by reducing a light emission intensity of a light source that generates light for irradiation of an area to be darkly displayed (hereinafter, referred to as a "low display brightness area") with respect to a certain area (hereinafter, referred to as a "high display brightness area"), it is possible to reduce the intensity of light that is emitted from the backlight unit and is incident to the low display brightness area compared with the intensity of light that is incident to the high display brightness area. Further, in a case where the image display device is a liquid crystal display device, an image display unit includes a pair of electrodes and a liquid crystal cell disposed between the electrodes. Preferably, a brightness control for each area of an image displayed on a display surface of the image display unit in the liquid crystal display device may be performed by controlling the liquid crystal cell for each area, in addition to a control of a light source light emission intensity. By controlling the intensity of light emitted from a backlight unit and passed through the liquid crystal cell by a voltage to be applied to the liquid crystal cell, it is possible to control the brightness for each area of the image displayed on the display surface. For this purpose, the local dimming control unit may create liquid crystal control information (including information about conditions of the voltage to be applied to the liquid crystal cell for each area) corresponding to the light source light emission intensity information, in addition to the light source light emission intensity information, on the basis of display brightness information, and may use a combination of the two types of information for control of display brightness.

With respect to creation of the display brightness information, the light source light emission intensity information and the liquid crystal control information in the above-described local dimming control unit, known techniques relating to the local dimming control may be applied without any limitation. For example, with respect to such a known technique, refer to JP2012-237903A, or the like.

Further, in a preferred aspect, the local dimming control unit may create light source light emission intensity information for each area of a backlight unit on the basis of display brightness information for each area of an image displayed on a display surface of an image display unit, and may determine a light emission intensity of each light source included in a multi-wavelength heterogeneous light source group of the backlight unit on the basis of the created light source light emission intensity information or corrected light source light emission intensity information obtained by performing a correction process based on the influence of leaked light that is generated from a light source allocated to a different area of the backlight unit with respect to the created light source light emission intensity information. Further, each light source included in the multi-wavelength heterogeneous light source group may emit light of the determined light emission intensity. In order to reduce tinting of a portion to be darkly displayed using the above-described multi-wavelength heterogeneous light source group, it is preferable that the correction process based on the influence of the leaked light that is generated from the light source allocated the different area in the backlight unit includes, as the influence of leaked light becomes larger, among two or more kinds of light sources included in the multi-wavelength heterogeneous light source group, (1) a process of increasing an absolute value or a relative value of a light emission intensity of a light source of which a light emission maximum wavelength is positioned on a long wavelength side, (2) a process of decreasing an absolute value or a relative value of a light emission intensity of a light source of which a light emission maximum wavelength is positioned on a short wavelength side, or (3) a process of increasing the absolute value or the relative value of the light emission intensity of the light source of which the light emission maximum wavelength is positioned on the long wavelength side and decreasing the absolute value or the relative value of the light emission intensity of the light source of which the light emission maximum wavelength is positioned on the short wavelength side. By using the corrected light source light emission intensity information obtained by performing such a correction process as necessary, it is possible to remove or reduce tinting that occurs in a portion to be darkly displayed due to the influence of leaked light that is generated from a light source allocated to a different area using the local dimming control. One aspect of the image display device of the invention includes an aspect in which in a case where tinting due to the influence of leaked light is in an allowable range, the light emission intensity of each light source included in the multi-wavelength heterogeneous light source group is determined using the light source light emission information created on the basis of the display brightness information, without using the corrected light source light emission intensity information. Here, the allowable range of tinting due to leaked light may be arbitrarily set according to image quality demanded for an image to be displayed on a display surface, and is not particularly limited.

Hereinafter, a process of acquiring corrected light source light emission intensity information will be described using the following embodiments as examples. In the following embodiments, all light sources which are respectively allocated to all areas for which backlight brightness is controlled correspond to the multi-wavelength heterogeneous light source group. Here, the invention is not limited to the following embodiments.

Embodiment 1 of Acquisition of Corrected Light Source Light Emission Intensity Information FIG. 1 is a diagram showing an area arrangement where a backlight brightness control for each area is performed in an embodiment. In FIG. 1, the number of areas (the number of control units) is 9, but this is merely an example, and a local dimming control according to the invention is not limited to being performed in 9 areas. This is similarly applied to other embodiments (which will be described later).

In FIG. 1, areas B and C are areas in which light sources are turned off (in which a backlight brightness setting value is set to zero) on the basis of light source light emission intensity information created on the basis of display brightness information, and an area A is an area which is lighted so that the backlight brightness setting value becomes 100 on the basis of the light source light emission intensity information created on the basis of the display brightness information. In this embodiment, the backlight brightness is represented as a relative value when the backlight brightness setting value in the area A is 100. Further, it is assumed that various numerical values relating to the areas A, B, and C are represented as relative values for contrast between the areas. The light source light emission intensity (light source light emission intensity information) for generating the backlight brightness setting value are set such that a light emission intensity of a light source allocated to the area A is 100 and light emission intensities of light sources allocated to the areas B and C are all zero. With respect to a liquid crystal display device, in a case where a chromaticity is represented as chromatic coordinates in a chromatic view (CIE 1931) regulated by Commission International de l'Eclairage (CIE), the chromaticity of white light may be set as a white point where x=0.33 and y=0.33, for example. In a case where the chromatic coordinate deviates from the white point, the white color is tinted (for example, becomes bluish or yellowish). In this embodiment, it is assumed that emission light emitted from the area A is white light where (x, y)=(0.33, 0.33) in chromatic coordinates in the chromatic view (CIE 1931). In the following description, unless otherwise noted, it is assumed that the chromaticity is represented as chromatic coordinates in the chromatic view (CIE 1931).

The above description relates to an initial setting value set without consideration of the influence of leaked light. Here, in reality, leaked light that is generated from a light source allocated to the area A which is the high brightness area is generated in the areas B and C which are the low brightness areas. The light intensity of the leaked light is larger in the leaked light to the area B which is closer to the area A than the leaked light to the area C. The light intensity of the leaked light varies depending on reflection in the above-described reflective member, scattering in the scattering member, reflection and/or scattering in a light scattering layer, a reflective member and an interface between members in the backlight unit. The light intensity of leaked light to a certain area from a different area may be measured by a known measurement device such as an actinometer, or may be calculated by an optical simulation using a known method. It is assumed that the light intensity of the leaked light to the area B obtained in this way is set to be 10 and the light intensity of the leaked light to the area C is 1.

On the other hand, it is considered that the degree that emission light emitted from a certain area is tinted by the influence of leaked light becomes larger as a distance from the high brightness area becomes longer. The reason is as follows. That is, it is considered that as a diffusion distance is longer, more light is wavelength-converted in the wavelength conversion layer and emission of red light and green light increases, and thus, yellowish tints increase by mixture of the red light and the green light. The level of yellow tints may be measured using a known colorimeter, or may be calculated by an optical simulation using a known method. It is assumed that the chromaticity of emission light emitted from the area B obtained in this way is (x, y)=(0.35, 0.35) (a difference between this chromaticity and the chromaticity of the emission light emitted from the area A is (Δx, Δy)=(0.02, 0.02)), and the chromaticity of emission light emitted from the area C is (x, y)=(0.38, 0.38) (a difference between this chromaticity and the chromaticity of the emission light from the area A is (Δx, Δy)=(0.05, 0.05)).

The light sources allocated to the areas A, B, and C have light emission maximum wavelengths from an ultraviolet light region to a blue light region, respectively. Two light sources having different light emission maximum wavelengths are allocated to each of the areas A, B, and C, and at least one thereof is a blue light source. Hereinafter, among the two light sources, a light source of which a light emission maximum wavelength is disposed on a short wavelength side is referred to as a short wave light source, and a light source of which a light emission maximum wavelength is disposed at a long wavelength side is referred to as a long wave light source.

In order to reduce the yellow tints in the area B and C, for example, in the areas B and C, by causing the short wave light source and the long wave light source allocated to each area to emit light and by making light obtained by mixture of emission light that is generated from the light sources and emission light (different emission light) obtained by light emission of a fluorescent body bluish, it is possible to negate or reduce yellow tints due to the leaked light. As described above, the fluorescent body has a tendency that as excitation light becomes shorter wavelength light, the light emission intensity becomes stronger, and as the excitation light becomes longer wavelength light, the light emission intensity becomes weaker. Here, it is assumed that the chromaticity of emission light obtained in a case where the short wave light source is independently used is (x, y)=(0.38, 0.38) and the chromaticity of emission light obtained in a case where the long wave light source is independently used (x, y)=(0.28, 0.28). In a case where the short wave light source and the long wave light source are used together, in a case where the light emission intensity of the long wave light source (a light source of which a light emission maximum wavelength is disposed on a relatively long wavelength side) becomes strong, the light emission intensity of fluorescence emitted by the fluorescent body (that is, light emission intensities of green light and red light) may decrease, and the light emission intensity of blue light that is generated from the blue light source relatively increases compared with the light emission intensity of light obtained by light emission of the fluorescent body. Thus, it is possible to make the light obtained by the above-mentioned color mixture bluish. By mixing the bluish light and the yellowish light due to the influence of the leaked light, as a result, it is possible to negate or reduce the yellow tints due to the leaked light.

As described above, when the backlight brightness setting value of the area A is 100, the light intensity of the leaked light to the area B is 10, and the chromaticity of the emission light emitted from the area B is different from the chromaticity of the emission light emitted from the area A by (Δx, Δy)=(0.02, 0.02). In this embodiment, by making light from the long wave light source among the two light sources allocated to the area B incident and by setting the light emission intensity so that a value corresponding to 5 is given as the backlight brightness, it is possible to negate the yellow tints. Further, as described above, with respect to the area C, the light intensity of the leaked light to the area C from the area A is 1, and the chromaticity of the emission light emitted from the area C is different from the chromaticity of the emission light emitted from the area A by (Δx, Δy)=(0.05, 0.05). By making light from the long wave light source among the two light sources allocated to the area C incident and by setting the light emission intensity so that a value corresponding to 1 is given as the backlight brightness, it is possible to negate the yellow tints.

As a result, all of the light emission intensities of the light sources allocated to the area B and the light emission intensities of the light sources allocated to the area C become larger than the initial setting value. In this way, by performing a correction process based on the influence of leaked light that is generated from a light source allocated to a different area with respect to the initial setting value, it is possible to obtain corrected light source light emission intensity information.

Next, an example of a preferred correction method based on a brightness difference between contiguous areas will be described.

A backlight brightness of each area of a backlight unit may be set according to a display brightness of each area of an image to be displayed, but in one aspect, when a backlight brightness difference between contiguous areas is large, it is preferable to set a display brightness in an image to be displayed to be higher than a backlight brightness to be given in a low brightness area. For example, by adjusting light emission intensities of one or more light sources of a multi-wavelength heterogeneous light source group allocated to a low brightness area, it is possible to adjust a tint of emission light emitted from this area to white light of a chromaticity (x, y)=(0.33, 0.33), or to adjust the tint to be close to the white light. Thus, it is possible to reduce yellow tints of emission light emitted from a low brightness area of the backlight unit, and to achieve natural connection of display images between areas in an image display device, to thereby achieve higher display quality.

In one aspect, with respect to the corrected backlight brightness as described above, when an absolute value of a backlight brightness (I2) in a high brightness area (in this embodiment, the area A) is 100 candela (cd)/m$^2$ or greater and 5,000 cd/m$^2$ or smaller, a relative relationship between a backlight brightness (I1) in a low brightness area (in this embodiment, the area B) having a relatively low brightness, which is contiguous to the high brightness area, and the I2 is preferably 100/1 or smaller, more preferably 4/1 to 100/1, and most preferably 4/1 to 50/1, as a ratio of (I2/I1). By setting the ratio of (I2/I1) to 100/1 or smaller, it is possible to make color reproducibility excellent, and to achieve natural connection of display images. Further, the setting of the ratio of (I2/I1) to 4/1 or greater is effective to enhance contrast and reduce power consumption of the backlight unit.

However, in a case where the above-described liquid crystal cell is included in the image display device, normally, liquid crystal control information (initial setting value) is also set together with light source light emission intensity information. On the other hand, according to the above-described procedure, with respect to the light source light emission intensity information, a difference occurs between the initial setting value and a light source light emission intensity which is actually set. As a result, the intensities of emission light emitted from the area B and emission light emitted from the area C in the backlight unit increase, but in a case where such an increase occurs, in order to reduce the intensity of light that passes through the liquid crystal cell, it is preferable to adjust voltage values to be applied to the liquid crystal cell. That is, it is preferable to perform a correction process with respect to the liquid crystal control information to acquire corrected liquid crystal control information, to determine a voltage application condition for each area (the area B and the area C) of the liquid crystal cell on the basis of the corrected liquid crystal control information, and to apply a voltage to each area of the liquid crystal cell under the determined voltage application condition. Thus, it is possible to match a display brightness on the display surface of the image display device with an initial setting value set according to a display brightness of an image to be displayed, or to bring the display brightness on the display surface of the image display device close to the initial setting value.

Further, there may also be a case where leaked light that is generated from the light sources of the area B and leaked light that is generated from the light sources of the area C enter the area A. Thus, the intensity of emission light emitted from the area A of the backlight unit increases. The influence of such an increase in the intensity of emission light can also be reduced under the above-described control of the voltage application condition of the liquid crystal cell.

Embodiment 2 of Acquisition of Corrected Light Source Light Emission Intensity Information Next, an example of acquiring corrected light source light emission intensity information on the basis of a numerical expression using two contiguous areas as target contiguous areas in which the influence of leaked light is considered will be described. Here, the following description is merely an example, and the target contiguous areas in which the influence of leaked light is considered may be one, three or more, which is not particularly limited.

In a case where an area i, an area i+1, and an area i+2 are sequentially disposed, when acquiring corrected light source light emission intensity information of the area i, in a case where the area i+1 which is primarily contiguous (directly connected to) to the area i and the area i+2 which is secondarily contiguous thereto (disposed through the area i+1) are set as the target contiguous areas in which the influence of leaked light is considered, a light source light emission intensity Ki in the area i may be corrected to have the following relationships with the primarily contiguous area i+1 and the secondarily contiguous area i+2. For example, with respect to nine areas shown in FIG. 3 (which will be described later), areas B, D, and E may be set as the primarily contiguous areas, and areas C, F, G, H, and I may be set as the secondarily contiguous areas, with respect to area A.

$$Ki = K0i \qquad (1)$$

$$+ \alpha 1 \times K0(i+1) + \alpha 2 \times K0(i+2) \qquad (2)$$

$$+ \alpha 1 \times Km(i+1) + \beta 2 \times Km(i+2) \qquad (3)$$

$$+ h1 \times \{\alpha 1 \times (K0(i+1) + Km(i+1))\} \qquad (4)$$

$$+ h2 \times \{\alpha 2 \times (K0(i+2) + Km(i+2))\} \qquad (5)$$

Here, $\alpha 1$ is a leaked light coefficient to the primary contiguous areas, $\alpha 2$ is a leaked light coefficient to the secondary contiguous areas, $K0i$ is an initial setting value of a light source light emission intensity in the area i, $Kmi$ is a light source light emission intensity which is increased for reduction of tinting in the area i, $K0(i+1)$ is an initial setting value of a light source light emission intensity in the area i+1, $Km(i+1)$ is a light source light emission intensity which is increased for reduction of tinting in the area i+1, $K0(i+2)$ is an initial setting value of a light source light emission intensity in the area i+2, $Km(i+2)$ is a light source light emission intensity which is increased for reduction of tinting in the area i+2, $h1$ is a light source light emission intensity increase coefficient with respect to leaked light from the primarily contiguous areas, and $h2$ is a light source light emission intensity increase coefficient with respect to leaked light from the secondarily contiguous areas.

(1) represents (the initial setting value of the light source light emission intensity in the area i), (2) represents (leaked light generated by light source light emission intensities of the initial setting values in the area i+1 and the area i+2), (3) represents (leaked light generated by the light source light emission intensities which are increased for reduction of tinting in the area i+1 and the area i+2), (4) represents (the light source light emission intensity which is increased for reduction of tinting in the area i, with respect to the leaked light from the area i+1), and (5) represents (the light source light emission intensity which is increased for reduction of tinting in the area i, with respect to the leaked light from the area i+2).

The above-mentioned various coefficients may be determined by performing, for example, a preliminary experiment, or may be determined on the basis of an optical simulation.

Further, in a case where the liquid crystal cell is included in the image display unit, the following aspect may be used as a specific aspect of the correction process performed using the above relational expressions.

On the basis of display brightness information for each area of an image displayed on the display surface of the image display unit, initial setting values of light source light emission intensities are respectively calculated with respect to light sources allocated to each area of the backlight unit. Further, as described in Embodiment 1, an initial setting value of liquid crystal control information is also set with respect to a liquid crystal cell.

On the basis of the calculated initial setting values (setting values 1) of the light source light emission intensities and the above relational expression between the respective areas, corrected light source light emission intensity information (setting value 2) in each area is calculated. Corrected liquid crystal control information (setting value 3) is determined by performing a correction process with respect to the liquid crystal control information on the basis of the setting value 2.

By causing the light source to emit light at the light emission intensity determined by the above-mentioned setting value 2 and applying a voltage to the liquid crystal cell under a voltage application condition determined by the setting value 3, an image is formed in the image display unit.

In the above-described embodiments 1 and 2, an example of increasing light emission intensities of light sources in order to reduce tinting has been described, but the invention is not limited to the embodiments. For example, with respect to light emission intensities of light sources, a configuration in which light emission intensities of a short wave light source and a long wave light source are adjusted so that a display brightness matches (or is close to) an initial setting value or a configuration in which an algorithm for preferentially using a long wave light source for generating bluish light is additionally provided may be used.

Both embodiments 1 and 2 relate to aspects in which a correction process is performed considering that with respect to a certain area, the influence of leaked light that is generated from a light source allocated to a different area is the same inside the area.

On the other hand, it is also possible to perform the correction process further considering that the influence of leaked light varies inside the same area. Hereinafter, such an embodiment will be described.

Embodiment 3 of Acquisition of Corrected Light Source Light Emission Intensity Information For example, as shown in FIG. 1, with respect to an area B, leaked light that is generated from light sources allocated to an area A has a strong intensity on a side close to the area A and has an attenuated small intensity on a side close to an area C, in a transverse direction in the area B. Further, since tinting of emission light from the area B due to the leaked light that is generated from the light sources allocated to the area A becomes stronger as a distance from the area A becomes longer, tinting on the side close to the area C becomes strong compared with the side close to the area A.

Accordingly, by setting the light emission intensities of the light sources on the side close to the area A to be lower than the light emission intensities of the light sources on the side close to the area C, in a multi-wavelength heterogeneous light source group allocated to the area B, it is possible to enhance uniformity of the intensities of emission light emitted from the area B in the transverse direction of the area B. Further, with respect to an intensity ratio of a light emission intensity of a long wave light source and a light emission intensity of a short wave light source (light emission intensity of long wave light source/light emission intensity of short wave light source), by setting the intensity ratio of the light sources on the side close to the area C to be larger than the intensity ratio of the light sources on the side close to the area A, it is possible to effectively reduce tinting on the side close to the area C where tinting becomes strong, in the area B. Further, thus, it is possible to enhance uniformity in tint of emission light emitted from the area B in the transverse direction of the area B.

The above description relates to one aspect of a correction process based on the influence of leaked light that is generated from light sources allocated to a different area of the backlight unit, in which a light emission intensity of at least one of a light source allocated to a portion that is greatly affected by the leaked light or a light source allocated to a different portion in the same area becomes different from a value determined by the light source light emission intensity information. Here, the invention is not limited to this aspect.

(Real-Time Control and Tabling Control)

As described above, in the image display device, a portion to be brightly displayed and a portion to be darkly displayed frequently change according to change in an image on the display surface. As a method for performing a local dimming control in accordance with such change in the image, a real-time control or a tabling control may be used. In the real-time control, for example, it is possible to calculate light emission intensities of light sources included in a multi-wavelength heterogeneous light source group for each area in real time by overlaying correction coefficients as shown in Embodiment 2, and to emit light from the light sources at the calculated light emission intensities.

On the other hand, the tabling control refers to a control using a lookup table in a computer science. A method for creating the lookup table is a known technique in the computer science, and such a known technique may be applied to the invention without any limitation. For example, changes of light source light emission intensities from initial setting values which may be generated in advance are patterned, and are stored in a lookup table. Further, by selecting a pattern to be applied to each light source from the patterns stored in the lookup table on the basis of display brightness information for each area of an image displayed on the display surface of the image display unit, a light source light emission intensity of each light source is determined. For example, as shown in FIG. 1, in a case where the local dimming control is performed in nine areas, in a case where an aspect in which a light source light emission intensity is controlled at four stages (for example, four stages of 100, 33, 11, and 0 as relative values) is used as an example, since four stage-light source light emission intensities can be obtained in nine areas, patterns between positions of the areas and the light source light emission intensities are the ninth power of 4 in total. By storing all the patterns in the lookup table and selecting a pattern to be applied on the basis of the display brightness information for each area of an image displayed on the display surface, a light source light emission intensity of each light source is determined.

The real-time control is preferable in terms of the accuracy of control, and the tabling control is preferable in that simple control is possible.

(Method for Controlling Light Source Light Emission Intensity)

The light emission intensities of the light sources included in the backlight unit may be changed for emission of light of light emission intensities determined as described above by the following means, for example. In the following description, an operation for changing a light emission intensity is referred to as dimming.

(1) A light emission intensity of a light source is changed by time-division emission.

(2) One or both of input values of an electric current and a voltage of a light source are changed.

A light emitting diode (LED) may be used as a light source as described above, but a method for realizing dimming in an LED drive circuit is generally divided into two types.

One is pulse width modulation (PWM control), and the other one is analog dimming.

The PWM control is a control for adjusting brightness by controlling a turn-on time and a turn-off time of an LED element. Generally, the brightness is controlled by adjusting a duty ratio (the ratio of an ON time in ON and OFF) of a PMW signal. Normally, the frequency of ON and OFF may be set to about 50 Hz to 32 KHz. In a case where a frequency of repetition of turning-on and turning-off is low, since the eyes of a human may feel "flickering", it is preferable to set the frequency of the PMW signal to be sufficiently high. In the case of a backlight unit for display, the frequency may be set to about 100 Hz to 10 KHz, and generally, about 200 Hz is used. Further, in an application such as a machine vision used in a manufacturing line or the like, the frequency may be set to about 1 KHz. A frequency at which flickering or crying does not occur may be selected according to its application. The crying is a phenomenon in which in a case where a voltage variation occurs in an output condenser in the PWM control, a substrate resonates to generate sound due to expansion and contraction of the condenser. The duty ratio may be arbitrarily set. For example, light may be reduced to about 1%, and thus, a brightness control range is large. Further, design of a control circuit is also relatively easy.

On the other hand, the analog dimming is a control for adjusting brightness by changing the amount of electric current be supplied to an LED element. In a case where the amount of electric current is increased, the brightness becomes high, and in a case where the amount of electric current is decreased, the brightness becomes low. The analog dimming may be realized by changing a voltage value supplied from the outside in an analog manner using an electronic volume, a variable resistor, or the like. In the analog dimming method, the flickering problem does not occur. Dimming (light reduction) to about 10% is possible on a low brightness side. In terms of color reproducibility of the LED element, it is preferable to use a range of dimming to about 20%.

Alternatively, both of the PWM control and the analog dimming may be used together. Further, in the PWM control, an electric current value may be reduced.

The above-described control may be performed on the basis of light source light emission intensity information created by the local dimming control unit or corrected light source light emission intensity information.

(Change in Initial Setting Value)

The above-described initial setting value is normally set in a backlight unit immediately after the backlight is manufactured, but there is also a case in which it is preferable to change the initial setting value to correct a temporal change of the backlight unit. The temporal change may include reduction in emission efficiency generated by temporal deterioration of a fluorescent body, staining generated by temporal deterioration of a member that forms a backlight unit, deterioration of a light source, or the like, for example. In such a case, it is possible to calculate a correction factor f, and to perform the local dimming control using a value obtained by multiplying an initial setting value by the correction factor f as the initial setting value. The correction factor may be determined on the basis of an evaluation result obtained by evaluating a temporal change in real time. Alternatively, the correction factor f may be determined in advance according to a usage period of a backlight unit.

Further, a value obtained by multiplying an initial setting value determined by a preliminary experiment or an optical simulation by a variation control adjustment factor f0 in consideration of a variation such as a difference between emission efficiencies of light sources included in a backlight unit may be used as the initial setting value.

<Image Display Unit>

The image display device may include an image display units depending on its type. As a specific aspect of the image display device of the invention, for example, a liquid crystal display device (LCD) may be used. In a preferred aspect, the image display device of the invention may be a liquid crystal display device formed by combining the above-described backlight unit with a liquid crystal panel. The liquid crystal panel may include at least a liquid crystal cell and a pair of electrodes in which the liquid crystal cell is interposed therebetween. A drive mode of the liquid crystal cell is not particularly limited, and various modes such as a twisted nematic (TN) mode, a super-twisted nematic (STN) mode, a vertical alignment (VA) mode, an in-plane switching (IPS) mode, an optically-compensated bend cell (OCB) mode may be used.

Generally, the liquid crystal panel includes at least a viewing side polarizer, a liquid crystal cell, and a backlight side (backlight unit side) polarizer. Further, each of the viewing side polarizer and the backlight side polarizer preferably includes a protective film (polarizing plate protective film) on one or both surfaces thereof. A laminate having one or more layers of protective films on a polarizer is referred to as a polarizing plate. In one embodiment of the liquid crystal display device, a liquid crystal cell in which a liquid crystal layer is interposed between opposing substrates of which at least one is provided an electrode, and the liquid crystal cell is disposed between two polarizing plates. The liquid crystal display device includes a liquid crystal cell in which liquid crystals are sealed between an upper substrate and a lower substrate, in which an orientation state of the liquid crystals is changed by voltage application to display an image. Here, as described above, the voltage application is performed under a voltage application condition determined on the basis of liquid crystal control information created by the local dimming control unit or corrected liquid crystal control information. Further, as necessary, the liquid crystal display device includes an additional functional layer such as a polarizing plate protective film, an optical compensating member for performing optical compensation, or an adhesive layer. In addition, a forward scattering layer, a primer layer, an antistatic layer, a surface layer such as an undercoat layer may be disposed together with (or instead of) a color filter substrate, a thin layer transistor substrate, a lens film, a diffusion sheet, a hard coat layer, an antireflection layer, a low reflective layer, an anti-glare layer, or the like.

As described above, according to the invention, in a backlight unit capable of controlling a backlight brightness for each area, by using the above-described multi-wavelength heterogeneous light source group, it is possible to prevent a portion to be darkly displayed from being tinted by white light emitted from the backlight unit under the local dimming control. With respect to the liquid crystal display device, as described above, in a case where the chromaticity is represented as chromatic coordinates in the chromatic view (CIE 1931), the chromaticity of white light may be set as a white point where (x, y) (0.33, y=0.33), for example. In a case where the chromatic coordinates deviate from the white point, the white light is tinted (for example, becomes bluish or yellowish). It is preferable that the light emission intensities of light sources included in the multi-wavelength heterogeneous light source group or the light emission intensity ratio between the light sources is set so that emission light emitted from each area of the backlight unit has the chromaticity of the white point where (x, y)=(0.33, y=0.33) or a chromaticity close to that of the white point. On the other hand, by causing the light source to emit light at the light emission intensity determined on the basis of the above-described corrected light source light emission intensity information, it is possible to remove or reduce yellow tints that occur due to the influence of leaked light. Thus, it is possible to reduce tinting of a portion to be darkly displayed.

For example, in a transmission type liquid crystal display device, emission light from a backlight unit passes through a liquid crystal cell, and then, is irradiated onto a display surface of the liquid crystal display device. In a liquid crystal display device in which a backlight brightness is constant on an entire surface thereof, an orientation state of liquid crystals of a liquid crystal cell is controlled to change the intensity of transmitted light for display of an image. With respect to an image including an area where a display brightness on a display surface is low, in a liquid crystal display device in which the local dimming control is not performed, an orientation state of liquid crystals in a liquid crystal cell is controlled in a state where the backlight brightness is uniformly maintained at the highest brightness, to thereby reduce the intensity of transmitted light and to reduce the display brightness in each area on the display surface.

On the other hand, in the local dimming control, with respect to an image including an area where a display brightness on a display surface is low, the intensity of light emitted from the backlight unit toward the area is reduced in advance, and then, the intensity of transmitted light is adjusted at a liquid crystal cell, to thereby make it possible to reduce power consumption of the backlight unit. According to the invention, it is possible to perform the local dimming control capable of reducing power consumption, and to reduce tinting of a portion to be darkly displayed by the local dimming control.

EXAMPLES

The invention will be more specifically described on the basis of examples. Details, procedures or the like of processes in the following examples may be appropriately modified without departing from the concept of the invention. Accordingly, the scope of the invention should not be interpreted in a limitative manner by the following examples.

Chromatic coordinates (chromaticity) described below are values obtained by representing values measured by a chromaticity luminance meter (SR-3 made by TOPCON corp.) using chromatic coordinates in the chromatic view (CIE 1931).

Light sources 1 to 3 which are used hereinafter are blue LED light sources that emit light of a single peak having a light emission maximum wavelength at the following wavelengths.

Light source 1: 450 nm
Light source 2: 465 nm
Light source 3: 430 nm

[Manufacturing of Backlight Unit]

Backlight units of Examples and Comparative Examples were manufactured as described below.

(Configuration of Backlight Unit)

Figure 2:
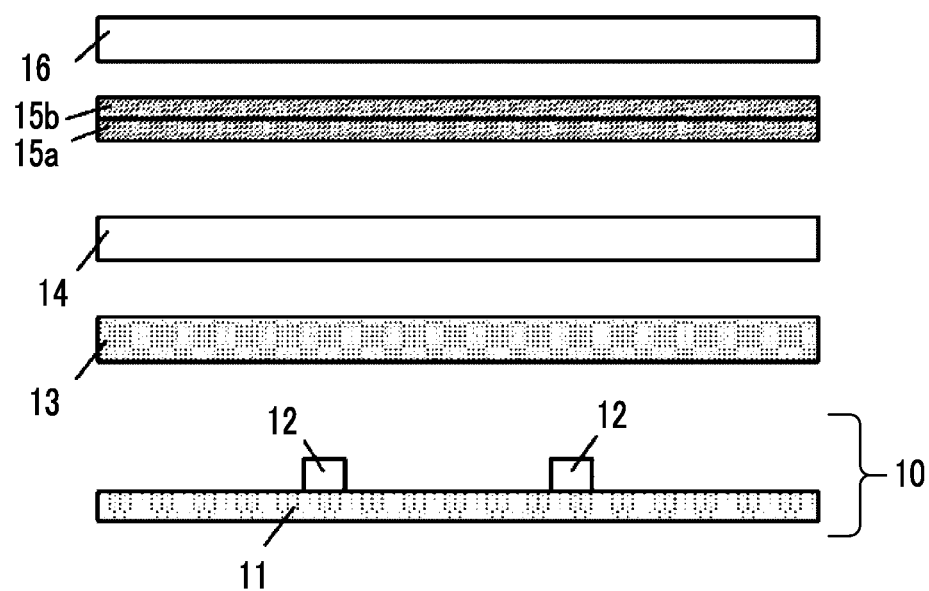
FIG. 2 is a diagram showing a schematic configuration of a backlight unit.

Each manufactured backlight unit is a directly-under type backlight unit. FIG. 2 shows a schematic configuration diagram of the backlight unit. The backlight unit shown in FIG. 2 sequentially includes, from a light source unit 10 side to an emission side, a light source unit 10, a wavelength conversion member 13 disposed on an optical path of light emitted from the light source unit, a scattering sheet 14, two prism sheets 15a and 15b in which prism arrays are disposed at right angles (the prism arrays are not shown), and a scattering sheet 16. In the light source unit 10, light sources 12 are disposed on a reflective sheet 11. In the figure, the number of light sources 12 is two for simplicity, but the number of light sources in Examples and Comparative Examples and detailed arrangements will be described later.

A wavelength conversion member in which a barrier film is layered on both sides of a wavelength conversion layer including a quantum dot 1 (green fluorescent body) of a light emission maximum wavelength of 520 nm and a quantum dot 2 (red fluorescent body) of a light emission maximum wavelength of 630 nm was used as the wavelength conversion member.

(Area Arrangement in which Backlight Brightness Control is Performed)

Figures 3, 4:
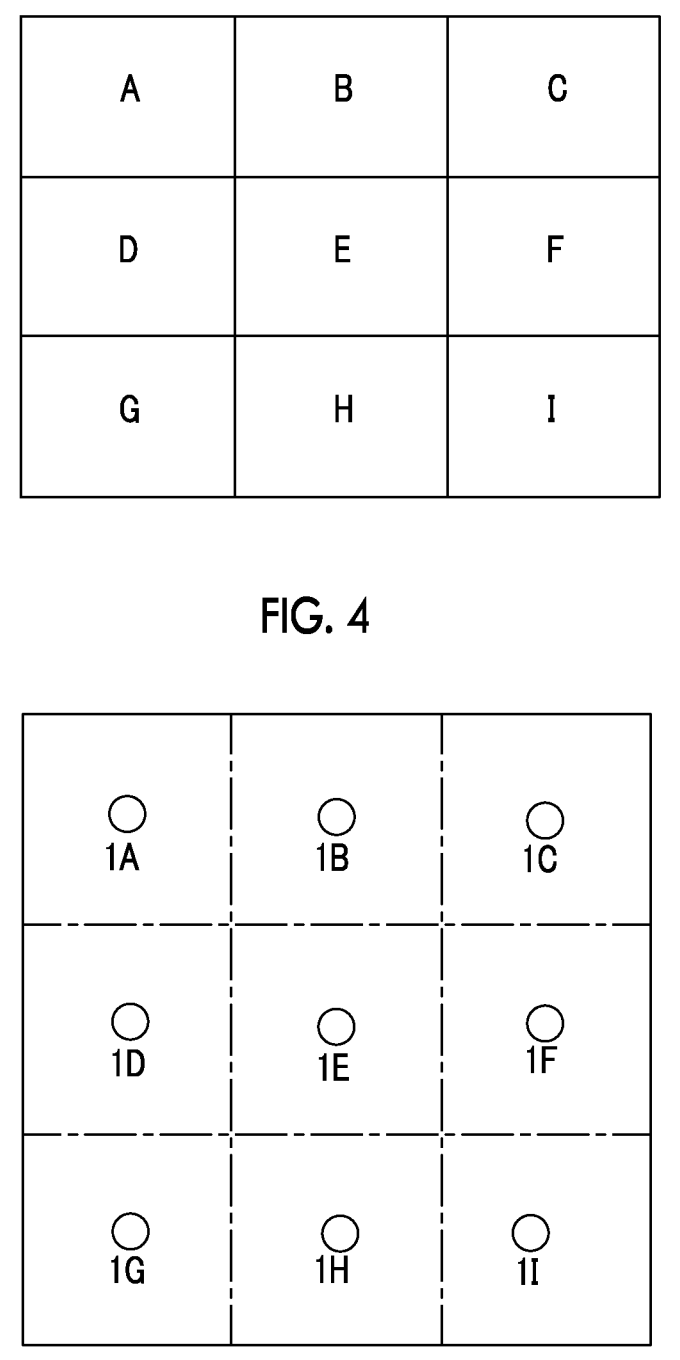

In the light source unit of the manufactured backlight unit, using a square of (9 cm in height×9 cm in width) as one area, the local dimming control is performed in total nine areas (areas A to I), as shown in FIG. 3.

On a display surface of a liquid crystal display device (which will be described later), the areas A to I are also disposed similar to FIG. 3.

Further, in a liquid crystal cell (which will be described later), the areas A to I are also disposed similar to FIG. 3.

(Light Source Arrangement and Manufacturing of Backlight Unit in Comparative Example 1)

In the light source unit 10 of the backlight unit, as shown in FIG. 4, using a square of (9 cm in height×9 cm in width) on the reflective sheet 11 as one area, one light source 1 (light emission maximum wavelength of 450 nm) was disposed in each area of total 9 areas. A light source allocated to an area A shown in FIG. 3 is a light source 1A, a light source allocated to an area B is a light source 1B, and a light source allocated to an area C is a light source 1C.

Similarly, light sources which are respectively allocated to areas D to I are light sources 1D to 1I.

Emission light (emission light from a surface of the scattering sheet 16 which is an emission-side outermost surface of a backlight unit) emitted from each area of a backlight unit in Comparative Example 1 that includes a light source unit in which the light sources 1 are disposed as described above was white light having a backlight brightness of 1,000 cd/m2 and a chromaticity of (x, y)=(0.33, y=0.33). Measurement of a backlight brightness in each area was performed by a chromaticity luminance meter (SR-3 made by TOPCON corp., aperture diameter 10 mmϕ), and a calculation average obtained by measurement at total five points including an intersection of two diagonal lines drawn in an area of a square of (9 cm in height×9 cm in width) and four points of centers of gravities of four triangles divided by these diagonal lines was used as a backlight brightness of each area. Measurement of the backlight brightness described below was similarly performed.

The backlight unit manufactured in Comparative Example 1 can arbitrarily control light source light emission intensities between about 0.5% and 100% by PWM-controlling the light sources 1. Further, the backlight brightness can be adjusted between 5 to 1,000 cd/m$^2$.

(Light Source Arrangement and Manufacturing of Backlight Unit in Example 1)

Figures 5, 6:
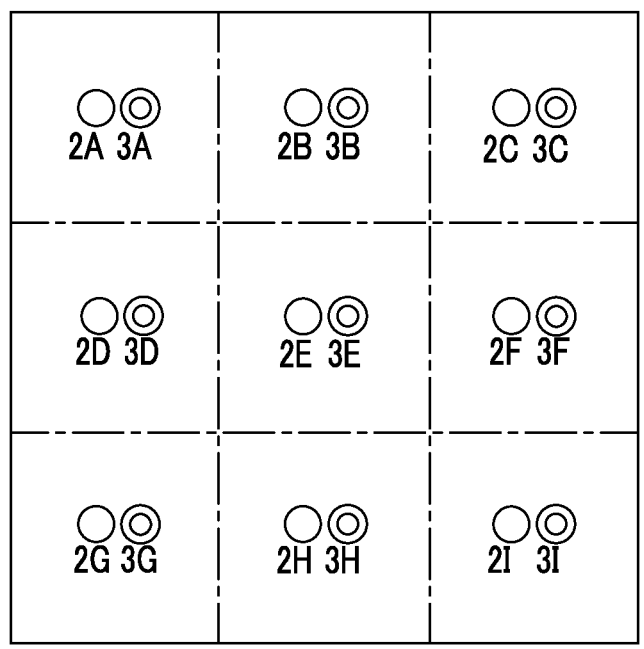
FIG. 5 is a diagram showing a light source arrangement according to Example 1.
FIG. 6 is a diagram for describing Example 1 (display brightness for each area in an image to be displayed).

In the light source unit 10 of the backlight unit, as shown in FIG. 5, using a square of (9 cm in height×9 cm in width) on a reflective sheet 11 as one area, one light source 2 (light emission maximum wavelength 465 nm) and one light source 3 (light emission maximum wavelength 430 nm) were disposed in each area of the total 9 areas. Accordingly, two types of light sources having different light emission maximum wavelengths are respectively disposed in one area. Light sources allocated to the area A shown in FIG. 3 are light sources 2A and 3A in FIG. 5, light sources allocated to the area B are light sources 2B and 3B, and light sources allocated to the area C are light sources 2C and 3C. Similarly, light sources respectively allocated to the areas D to I are light sources 2D to 2I and light sources 3D to 3I. In FIG. 5, the light sources 2 are represented by circles, and the light sources 3 are represented by double circles. The light sources 2 and 3 allocated to the respective areas can independently control light emission intensities.

The backlight unit in Example 1 was manufactured in a similar way to Comparative Example 1 except that the light source unit was replaced with the light source unit in which the light sources 2 and 3 were disposed as described above. In the backlight unit in Example 1, in a case where only the light source 2 of which the light emission maximum wavelength was disposed on a longer wavelength side in each area, among the light sources allocated to the areas A to I, was lighted, emission light emitted from each area was strong bluish white light having a backlight brightness of 1,000 cd/m$^2$ and a chromaticity of (x, y)=(0.27, y=0.27). On the other hand, in a case where only the light source 3 of which the light emission maximum wavelength is disposed on a shorter wavelength side in each area is lighted, emission light emitted from each area was strong yellowish white light of a backlight brightness of 1,000 cd/m$^2$ and a chromaticity of (x, y)=(0.40, y=0.40).

In the backlight unit in Example 1, the light sources 2 and the light sources 3 are respectively PWM-controlled, so that light source light emission intensities can be arbitrarily controlled between about 0.5% to 100%, or so that the light sources 2 and the light sources 3 can be turned off. For example, by adjusting an intensity ratio of a light source light emission intensity of the light source 2 and a light source light emission intensity of the light source 3 allocated to a certain area, it is possible to mix emission light with a strong bluish color and emission light with a strong yellowish color, to thereby change the chromaticity of emission light. Such a change in the chromaticity cannot be realized in the backlight unit in Comparative Example 1.

Further, in the backlight unit of Example 1, since the light sources 2 and the light sources 3 are allocated to the respective 9 areas of which the light emission intensities can be independently controlled, it is possible to independently change the chromaticity of emission light in each area.

[Assembly of Liquid Crystal Display Device]

A transmission type liquid crystal display including a directly-under type backlight unit on the market was disassembled to extract a backlight unit. The backlight unit of Comparative Example 1 was disposed in place of the extracted backlight unit to obtain a liquid crystal display device of Comparative Example 1. Similarly, the backlight unit of Example 1 was disposed to obtain a liquid crystal display device of Example 1.

[Local Dimming Control]

A local dimming control in a case where images having different display brightnesses in respective in-plane portions are displayed, as shown in FIG. 6, on a display surface of the liquid crystal display device of Example 1 will be described.

An area on a display surface to which emission light from the area A of the backlight unit is incident through a liquid crystal cell is set as an area A, and an area on the display surface to which emission light from the area B of the backlight unit is incident through a liquid crystal cell is set as an area B. Further, an area C to an area I are similarly set. In the area A (upper left area among nine square areas shown in FIG. 6) on the display surface, in a portion with the highest display brightness, that is, in a portion in which a numerical value of 100 is written in FIG. 6, a display brightness measured by the above-described measurement device used for measurement of the backlight brightness was 300 cd/m$^2$. When the brightness of this portion (hereinafter, referred to as a "brightest image portion") is represented as 100, numerical values obtained by displaying brightnesses to be displayed in respective portions as relative values are numerical values written in respective portions in FIG. 6. A numerical value 0 represents a state in which an orientation state of the liquid crystal cell is controlled to set the intensity of light passing through the liquid crystal cell to become minimum. Further, a chromaticity obtained in the portion indicated by the numerical value 100 was (x, y)=(0.33, 0.33).

By setting the light emission intensity of the light sources allocated to the area A of the backlight unit, which emit light toward the area A including the brightest image portion, as 100, the light emission intensity (relative value) of the light sources allocated to each area of the backlight unit is set.

In a backlight unit in which the local dimming control is not performed (hereinafter, referred to as "non-local dimming (LD)"), the light emission intensity (relative value) of the light sources allocated to each area is shown in FIG. 7.

Further, as the local dimming control, local dimming control patterns having three different patterns (hereinafter, referred to as "LD-01", "LD-02", and "LD-03") were set. The light emission intensity (relative value) of the light sources allocated to each area in the backlight unit is shown in FIGS. 8 to 10 under each local dimming control.

The control of LD-01 (FIG. 8) is a control in determining, only with respect to the areas A and B having display brightnesses which are not zero in FIG. 6, light emission intensities (relative values) of light sources according to maximum display brightnesses in the areas, and irradiating only the areas A and B of the backlight unit with emission light that is generated from the light sources.

The control of LD-02 (FIG. 9) is a control in irradiating the area D which is contiguous to the area A including the brightest image portion and is greatly affected by leaked light through one side of the square, in addition to the control of LD-01, with emission light that is generated from the light sources at a light emission intensity (relative value) of 5.

In addition, the control of LD-03 (FIG. 10) is a control in making emission light that is generated from the light sources, at a light emission intensity (relative value) of 1, to the areas C, E, and G which are contiguous to the areas B and D irradiated with emission light that is generated from the light sources at the light emission intensity (relative value) of 5 and are affected by leaked light through one side of each square, in addition to the control of LD-02.

Further, with respect to each of non-LD, LD-01, LD-02, and LD-03, liquid crystal control information for each area of the liquid crystal cell is determined so that display brightness shown in FIG. 6 is obtained in each area of a display surface.

Light source light emission intensity information and liquid crystal control information (initial setting value) for each area were determined with respect to each of non-LD, LD-01, LD-02, and LD-03 according to the above-described procedure.

With respect to each of non-LD, LD-01, LD-02, and LD-03, in a state where light sources allocated to each area of the backlight unit emitted light at a light emission intensity of the initial setting value, backlight brightnesses in the areas A to I were measured using the above-described method.

As a result of the measurement, with respect to LD-01, it was confirmed that the area D and the area E which were contiguous to the area A having a high backlight brightness had backlight brightnesses higher than those of different areas (see FIG. 8) of which the light source light emission intensity was 0. Further, with respect to the area B, it was confirmed that the backlight brightness becomes high with respect to a value predicted from the light emission intensity of the light sources. Thus, it was confirmed that when the chromaticity of emission light from the backlight unit was calculated in the areas B, E, D where the backlight brightness is higher than the predicted value from the light source light emission information in this way, the x value and the y value were all increased by about 0.02 to 0.04 and the emission light became yellowish. As a result, it was confirmed that in a state where light emission was performed at the light emission intensity of the initial setting value, in LD-01, the areas B, D, and E were tinted due to the influence of leaked light that occurred from the light sources allocated to the different areas.

Accordingly, in the backlight unit of Example 1, it was confirmed that when the light emission intensity of the light source 2 that generated strong bluish emission light was set to be relatively higher than the light emission intensity of the light source 3, among the light sources (light source 2 and light source 3) allocated to the area B in LD-01, the areas B and D in LD-02, and the areas B, C, D, E, and G in LD-03, to calculate the chromaticity of the emission light from each area, yellow tints in each area were reduced (here, a total light emission intensity of the two types of light sources was uniformly maintained). On the basis of the above description, the light emission intensity of the light source 2 and the light emission intensity of the light source 3 in the above-described areas were determined as corrected light emission intensity information. With respect to different areas, the initial setting value was used as light source light emission intensity information.

As described above, with respect to each of LD-01, LD-02, and LD-03, the light emission intensity of each light source was determined. In a state where the light sources allocated to each area of the backlight unit emitted light at the determined light emission intensity, the backlight brightness was measured by the above-described method in each of the areas A to I. With respect to non-LD, in a state where each light source emitted light at the light emission intensity of the initial setting value, the backlight brightness was measured by the above-described method in the areas A to I. A measurement result of non-LD is shown in FIG. 11, and measurement results of LD-01, LD-02, and LD-03 are shown in FIGS. 12 to 14.

In the results shown in FIGS. 12 to 14, even in areas in which the light emission intensity of the light source is 0, a value of the backlight brightness is 0.1 at the minimum, but it is considered that this value is generated due to the influence of light scattered in the backlight unit. Further, in the result shown in FIG. 11, even in the area A, it was confirmed that the backlight brightness was increased. It is also considered that this increase is generated due to the influence of leaked light from different areas.

Subsequently, on the basis of the backlight brightness in each area of the backlight unit obtained in this way, corrected liquid crystal control information of the liquid crystal cell was calculated and determined. In each area of the liquid crystal cell, when light from the backlight unit was incident at the backlight brightness shown in FIG. 11, the transmittance of the liquid crystal cell is controlled so that desired display brightness information is obtained on the display surface. That is, by setting the light emission intensity of the light source according to the above-described corrected light emission intensity information, with respect to an area where the intensity of light incident to the liquid crystal cell was larger than the initial setting value, a correction process of correcting a value corresponding to the increase and adjusting a voltage value to be applied to the liquid crystal cell to reduce the transmittance of the light in the area was additionally performed.

According to the above-described procedure, the light emission intensities of the light sources allocated to each area of the backlight unit and a voltage application condition in each area of the liquid crystal cell were determined with respect to LD-01, LD-02, and LD-03.

[Evaluation of Backlight Unit and Liquid Crystal Display Device]

Evaluation 1. Hue change between areas of backlight unit

With respect to the backlight unit in Example 1, the non-LD control (reference) or the local dimming control shown in Table 1 was performed. The local dimming control shown with respect to Example 1 in Table 1 was performed at the light emission intensities and the voltage application condition determined in the above-described procedure.

With respect to the liquid crystal display device in Comparative Example 1, light source light emission intensity information and liquid crystal control information (initial setting value) for each area were determined in a similar way to LD-01. The local dimming control performed by the initial setting value is written as LD-04 in Table 1.

With respect to each case, a function evaluation was performed in such a manner that five evaluators visually observed nine areas of the backlight unit to determine whether the evaluators felt hue change between areas or whether there was an area where the evaluators felt yellow tints. The five evaluators performed the evaluation using the following points and a calculation average of points of the five evaluators was calculated.

4 points: Hue change between areas is never felt.

3 points: Yellow tints are not felt in a high brightness portion, but are slightly felt in a low brightness portion.

2 points: Yellow tints are not felt in a high brightness portion, but are slightly felt in a low brightness portion which is contiguous to the high brightness portion.

1 point: Yellow tints are not felt in a high brightness portion, but are felt in a low brightness portion which is contiguous to the high brightness portion.

Evaluation 2. Hue change between areas in image displayed on display surface

With respect to each of the liquid crystal display device of Example 1 and the liquid crystal display device of Comparative Example 1, the non-LD control or the local dimming control shown in Table 1 was performed. Further, in Example 1, with respect to the light sources (light source 2 and light source 3) allocated to each area of the backlight unit in which the yellow tints were confirmed, light emission intensities were set according to the above-described corrected light emission intensity information.

With respect to each case, a function evaluation was performed in such a manner that five evaluators visually observed an image displayed on a display surface (see FIG. 6) to determine whether the evaluators felt yellow tints in portions having different display brightnesses. The five evaluators performed the evaluation using the following points and a calculation average of points of the five evaluators was calculated.

4 points: Yellowish tints are never felt.

3 points: Yellowish tints are not felt in a high brightness portion, but are slightly felt in a low brightness portion.

2 points: Yellow tints are not felt in a high brightness portion, but are slightly felt in a low brightness portion which is contiguous to the high brightness portion.

1 point: Yellow tints are not felt in a high brightness portion, but are felt in a low brightness portion which is contiguous to the high brightness portion.

Evaluation 3. Naturalness or unnaturalness of boundary connection in image displayed on display surface In an image displayed on a display surface in a similar way to the above-described evaluation 2, five evaluators performed a function evaluation by visually observing whether a boundary connection between the area D and the area E is natural or unnatural. The five evaluators performed the evaluation using the following points and a calculation average of points of the five evaluators was calculated. In the image displayed on the display surface, images in the area D and the area E are originally displayed uniformly as black, but in a case where display brightness or tint is affected by leaked light from an area A or an area B which is a contiguous bright area, there is a tendency that unnaturalness is felt in a boundary connection.

4 points: Boundary connection between the area D and the area E is natural.

3 points: Boundary connection between the area D and the area E is almost natural (four points represent more natural).

2 points: Slightly unnaturalness is felt at the boundary between the area D and the area E.

1 point: Unnaturalness is felt at the boundary between the area E and the area E (more unnatural than two points).

Evaluation 4. Evaluation of tinting in dark place

In an image displayed on a display surface in a similar way to the above-described evaluation 2, five evaluators performed a function evaluation by visually observing whether black was dark or not between areas darkly (blackly) displayed (between areas given a numerical value of 0 (zero) in FIG. 6) and whether a black tint difference was felt between the areas. The evaluation was performed in a state where a liquid crystal display device was disposed on a table at an illuminance of 20 lx. This is an environment close to a condition that a user watches TV in a dark room. The five evaluators performed the evaluation using the following points and a calculation average of points of the five evaluators was calculated.

4 points: Black is dark, and a difference in tint is not felt between areas.

3 points: Black is dark and a slight black tint difference is felt in comparison between areas, but the difference is not concerned at all.

2 points: Black is dark, but a black tint difference is felt in comparison between areas.

1 point: Due to light leakage, it can be recognized that black becomes bright, or a black tint difference is felt in comparison between areas.

In the above-described function evaluations, when the average point of the evaluations is 2.5 or smaller, half or more evaluators feel the influence of tinting. It is preferable that the average point of evaluation is 2.6 or greater.

The above-described results are shown in Table 1. Further, in table 1, power consumption in each local dimming control is shown using power consumption of the backlight unit in non-LD as 100.0%.

TABLE 1

| | | Backlight unit | | |
| --- | --- | --- | --- | --- |
| | Control method | | Power consumption | Evaluation 1 |
| Example 1 | Non-LD (see) | | 100.0% | 4.0 |
| | LD-01 | | 11.7% | 3.2 |
| | LD-02 | | 12.2% | 3.8 |
| | LD-03 | | 12.6% | 4.0 |
| Comparative Example 1 | Non-LD | | 100.0% | 4.0 |
| | LD-04 | | 11.7% | 2.2 |

| | | Liquid crystal display device | | |
| --- | --- | --- | --- | --- |
| | Control method | Evaluation 2 | Evaluation 3 | Evaluation 3 |
| Example 1 | Non-LD (see) | 4.0 | 4.0 | 1.2 |
| | LD-01 | 4.0 | 3.8 | 3.0 |
| | LD-02 | 4.0 | 4.0 | 3.8 |
| | LD-03 | 4.0 | 4.0 | 4.0 |
| Comparative Example 1 | Non-LD | 4.0 | 4.0 | 1.2 |
| | LD-04 | 2.0 | 2.2 | 2.4 |

Evaluation Results

The local dimming control for controlling the backlight brightness for each area according to the display brightness of a display image is effective for reduction in power consumption of the backlight unit, as shown in Table 1.

Further, from comparison between LD-01, LD-02, and LD-03 in Example 1 relating to Evaluation 1 and LD-04 in Comparative Example 1, it is possible to confirm that tinting of light emitted from the backlight unit, which occurs in a low brightness area in the local dimming control, is reduced according to LD-01, LD-02, and LD-03. Further, from comparison between LD-01, LD-02, and LD-03 in Example 1 relating to Evaluation 2 and LD-04 in Comparative Example 1, it is possible to confirm that tinting in an image displayed on a display surface in the local dimming control is reduced according to LD-01, LD-02, and LD-03. From the results of Evaluation 3 and Table 4, it was also confirmed that boundary connection between contiguous areas could be displayed as a natural image on the display surface according to LD-01, LD-02, and LD-03 in Example 1. In addition, from the result of Evaluation 4, it was confirmed that a black tint difference or a brightness difference between areas that are blackly (darkly) displayed, observed in a dark place, could be reduced according to LD-01, LD-02, and LD-03 in Example 1. More detailed content thereof is as follows. According to the local dimming control, it is possible to lower the black brightness (to make black darker), which is effective for enhancement of a contrast ratio (the ratio of "white brightness/black brightness"). Furthermore, as shown in the result of Evaluation 4, according to LD-01, LD-02, and LD-03 in Example 1, since it is possible to reduce a black tint difference or a brightness difference between areas that are blackly (darkly) displayed, it was confirmed that a more natural image was visually recognized even in a dark place.

From the above-described results, it was confirmed that by performing the above-described local dimming control in advance using a multi-wavelength heterogeneous light source group, it was possible to reduce tinting of a portion to be darkly displayed by the local dimming control, and as a result, a more natural image could be displayed on a display surface.

In LD-01, in an area (area B) to which emission light is emitted from a light source on the basis of light source light emission intensity information created on the basis of display brightness information, emission light is emitted from a multi-wavelength heterogeneous light source group on the basis of corrected light emission intensity information.

On the other hand, in LD-02 and LD-03, with respect to an area (area D in LD-02 and areas C, D, E, and G in LD-03) in which light sources are turned off (in which a backlight brightness setting value is 0) on the basis of the light source light emission intensity information created on the basis of the display brightness information, similarly, emission light is emitted from the multi-wavelength heterogeneous light source group on the basis of the corrected light source light emission intensity information.

From the result shown in Table 1, according to LD-02 and LD-03 compared with LD-01, it is possible to confirm that it is possible to further reduce tinting of light emitted from a backlight unit, which occurs in a low brightness area in the local dimming control, and to display a more natural image on a display surface.

Modified Examples (Arrangement of Light Sources)

In Example 1, two types of light sources having different light emission maximum wavelengths are allocated to each area of a backlight unit (see FIG. 5).

Figure 15:
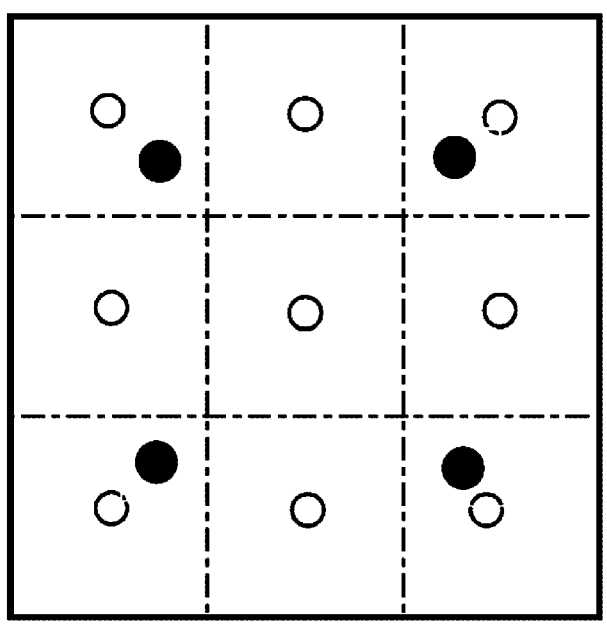
FIG. 15 is a diagram showing an example of a light source arrangement.

Here, the number of light sources having different light emission maximum wavelengths may vary according to areas. Further, plural areas may include an area where the allocated light sources are a single type of light sources. An arrangement example of the light sources which are disposed in this way is as shown in FIG. 15. In FIG. 15, a light source represented by circles is a long wave light source, and a light source represented by black circles is a short wave light source. As described above, the long wave light source generates strong bluish emission light. It is preferable that the number of light sources that generate strong bluish emission light is large in view of enhancement of the degree of freedom for control for reduction of tinting.

INDUSTRIAL APPLICABILITY

The invention is useful in a manufacturing field and a usage field of various image display devices such as a liquid crystal display device.

What is claimed is:
1. An image display device comprising:
  a backlight unit capable of controlling a backlight brightness for each of areas, comprising:
    a light source unit; and
    a wavelength conversion member that is disposed on an optical path of light emitted from the light source unit,
    wherein the wavelength conversion member includes a wavelength conversion layer including at least a fluorescent body that is excited by excitation light and emits green light and a fluorescent body that is excited by excitation light and emits red light,
    wherein the light source unit includes a light source allocated to each of the areas,
    wherein a control of the backlight brightness for each area is performed by controlling a light emission intensity of each light source allocated to each area independently of a light emission intensity of a light source allocated to a different area, and
    wherein a light source allocated to at least one area includes a light source group including two or more kinds of light sources having different light emission maximum wavelengths, and a light emission intensity of at least one kind of light source included in the light source group is capable of being controlled independently of a light emission intensity of a different light source included in the light source group;
  an image display unit; and
  a local dimming control unit,
  wherein the local dimming control unit creates light source light emission intensity information for each area of the backlight unit on the basis of display brightness information for each area of an image to be displayed on a display surface of the image display unit, and determines a light emission intensity of each light source included in a light source group including two or more kinds of light sources having different light emission maximum wavelengths on the basis of the created light source light emission intensity information, or on the basis of corrected light source light emission intensity information obtained by performing a correction process based on the influence of leaked light that is generated from a light source allocated to a different area of the backlight unit with respect to the created light source light emission intensity information, and
  wherein each light source included in the light source group emits light having the determined light emission intensity.

2. The image display device according to claim 1,
  wherein the correction process based on the influence of the leaked light that is generated from the light source allocated to the different area of the backlight unit includes, as the influence of the leaked light becomes larger, among two or more kinds of light sources included in the light source group, a process of increasing an absolute value or a relative value of a light emission intensity of a light source of which a light emission maximum wavelength is positioned on a long wavelength side, a process of decreasing an absolute value or a relative value of a light emission intensity of a light source of which a light emission maximum wavelength is positioned on a short wavelength side, or a process of increasing the absolute value or the relative value of the light emission intensity of the light source of which the light emission maximum wavelength is positioned on the long wavelength side and decreasing the absolute value or the relative value of the light emission intensity of the light source of which the light emission maximum wavelength is positioned on the short wavelength side.

3. The image display device according to claim 1,
wherein the image display unit includes a pair of electrodes and a liquid crystal cell disposed between the electrodes,
wherein the local dimming control unit creates liquid crystal control information for each area of the liquid crystal cell on the basis of the display brightness information for each area of the image to be displayed on the display surface of the image display unit, and determines a voltage application condition for each area of the liquid crystal cell on the basis of the created liquid crystal control information or on the basis of corrected liquid crystal control information obtained by performing a correction process based on the corrected light source light emission intensity information with respect to the created liquid crystal control information, and
wherein the pair of electrodes applies a voltage to the liquid crystal cell under the determined voltage application condition.

4. The image display device according to claim 1,
wherein the correction process based on the influence of the leaked light that is generated from the light source allocated to the different area of the backlight unit includes a process of setting a light emission intensity of at least one of a light source allocated to a portion that is greatly affected by leaked light or a light source allocated to a different portion in the same area to be different from a value determined by the light source light emission intensity information.

5. The image display device according to claim 1,
wherein each light source allocated to each area includes a light source group including two or more kinds of light sources having different light emission maximum wavelengths, and a light emission intensity of at least one kind of light source included in the light source group is capable of being controlled independently of a light emission intensity of a different light source included in the light source group.

6. The image display device according to claim 5,
wherein the light emission maximum wavelengths of the light sources included in the light source group are in a range from a blue light wavelength band to an ultraviolet light wavelength band.

7. The image display device according to claim 6,
wherein the light source is a light emitting diode, and the wavelength conversion member is a sheet shaped member.

8. The image display device according to claim 5,
wherein the light source is a light emitting diode, and the wavelength conversion member is a sheet shaped member.

9. The image display device according to claim 1,
wherein the light emission maximum wavelengths of the light sources included in the light source group are in a range from a blue light wavelength band to an ultraviolet light wavelength band.

10. The image display device according to claim 9,
wherein the light source is a light emitting diode, and the wavelength conversion member is a sheet shaped member.

11. The image display device according to claim 1,
wherein the light source is a light emitting diode, and the wavelength conversion member is a sheet shaped member.

12. The image display device according to claim 1, further comprising:
at least one member having a reflective characteristic on at least one of an emission side of the wavelength conversion member or a light source unit side thereof.

13. The backlight unit according to claim 12,
wherein the member having the reflective characteristic includes at least one sheet shaped member.

* * * * *